(12) United States Patent
Uchiyama et al.

(10) Patent No.: US 7,444,870 B2
(45) Date of Patent: Nov. 4, 2008

(54) ANGULAR VELOCITY SENSOR HAVING ONE AMPLIFYING CIRCUIT FOR AMPLIFYING PLURAL DETECTION SIGNALS

(75) Inventors: Takeshi Uchiyama, Chiba (JP); Mitsuo Yarita, Chiba (JP); Akira Egawa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/655,576

(22) Filed: Jan. 19, 2007

(65) Prior Publication Data

US 2007/0180909 A1 Aug. 9, 2007

(30) Foreign Application Priority Data

Feb. 7, 2006 (JP) ............................. 2006-029852
Nov. 24, 2006 (JP) ............................. 2006-317676

(51) Int. Cl.
*G01P 9/04* (2006.01)
(52) U.S. Cl. ................................................. 73/504.12
(58) Field of Classification Search ............. 73/504.02, 73/504.04, 504.12, 504.14, 504.15, 504.16
See application file for complete search history.

(56) References Cited

U.S. PATENT DOCUMENTS 5,894,090 A * 4/1999 Tang et al. ............... 73/504.02
6,584,845 B1 * 7/2003 Gutierrez et al. ......... 73/514.15
7,159,441 B2 * 1/2007 Challoner et al. ............. 73/1.77
7,320,253 B2 * 1/2008 Hanazawa et al. ..... 73/862.042

FOREIGN PATENT DOCUMENTS

JP 2005315824 11/2005

* cited by examiner

*Primary Examiner*—Helen C. Kwok
(74) *Attorney, Agent, or Firm*—Adam & Wilks

(57) ABSTRACT

An angular velocity sensor amplifies a plurality of detection signals using one amplifying circuit and separates these detection signals after amplification. The angular velocity sensor detects displacements of a mass in the axial directions using x-, y- and z-axis detection circuits. A carrier wave whose phase is shifted 90° from that of a carrier wave of the z-axis detection circuit is applied to the x- and y-axis detection circuits and outputs of the axis detection circuits are collectively inputted to a current/voltage conversion circuit which outputs a combined signal to three synchronous detection circuits that separate the signal into x-, y- and z-axis detection signal components. In the synchronous detection circuits, by applying phase division processing to the combined signal, the z-axis detection signal component is separated from cross axis detection signal components and by applying time division processing to the signal components based on switching timing of the carrier wave, the x- and y-axis detection signal components are separated from each other.

20 Claims, 14 Drawing Sheets

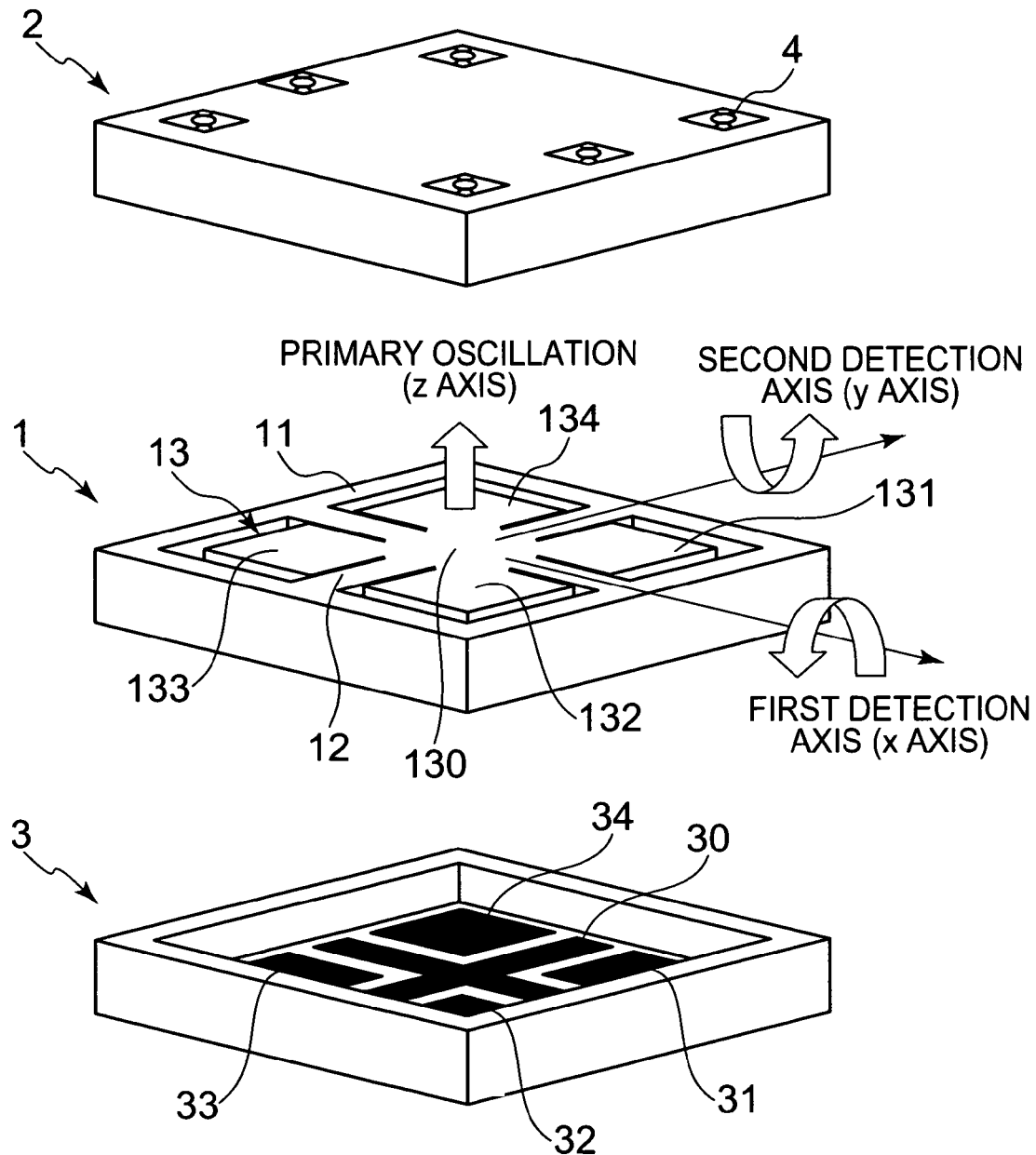

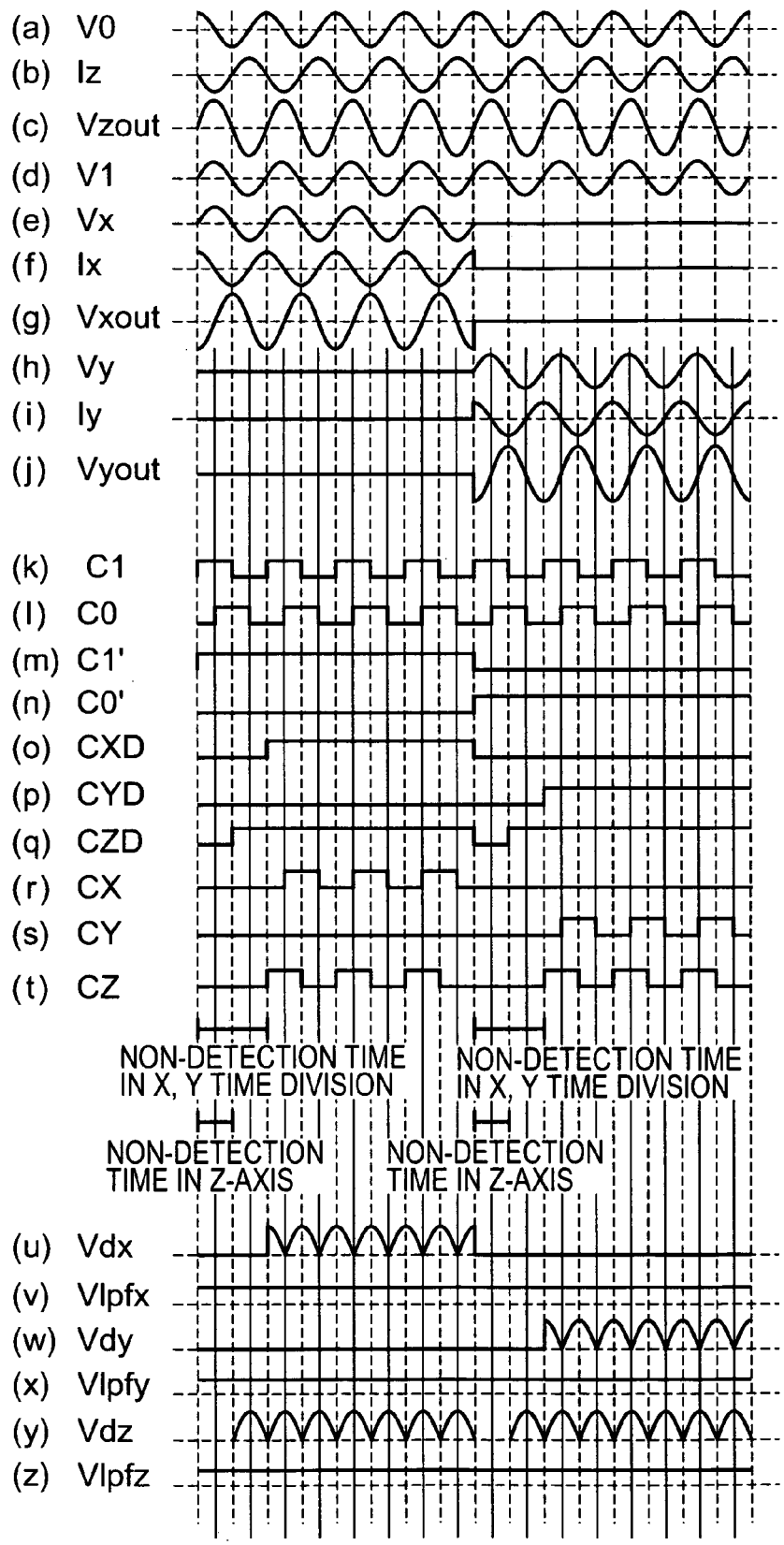

ANGULAR VELOCITY SENSOR HAVING ONE AMPLIFYING CIRCUIT FOR AMPLIFYING PLURAL DETECTION SIGNALS

BACKGROUND OF THE INVENTION

1. Field of the Invention

The present invention relates to an angular velocity sensor which detects angular velocity acting on an object, more particularly to an angular velocity sensor of an electrostatic capacitance detection type which detects the angular velocity acting on the object based on a change of an electrostatic capacitance.

2. Description of the Related Art

In wide fields including a camera-shake correction device of a video camera, an air back device for a vehicle and a posture control device of a robot, a mechanical dynamic quantity sensor such as an acceleration sensor or an angular velocity sensor is used.

As such a mechanical dynamic quantity sensor, there has been known an electrostatic-capacitance-detection-type sensor which detects the displacement of a mass based on a change of electrostatic capacitance between an electrode mounted on a mass (a mass body) which constitutes a movable body and a fixed electrode, and detects a mechanical dynamic quantity based on the displacement of the mass.

In such an electrostatic-capacitance-detection-type mechanical dynamic quantity sensor, to detect the change of the electrostatic capacitance between the electrodes, a C/V (electrostatic capacitance/voltage) conversion device which converts the electrostatic capacitance to a voltage corresponding to the electrostatic capacitance is used.

The C/V conversion device includes, for properly detecting a minute change of the electrostatic capacitance, an amplifier which amplifies amplitude of a signal for every axis or for every electrostatic capacitance element for detecting a mechanical dynamic quantity acting on the object.

The number of amplifiers for such signals is increased along with the increase of the number of detection axis of the mechanical dynamic quantities and hence, there is observed a tendency that a circuit becomes complicated and large-sized with respect to a multiple-axis detection type sensor.

Accordingly, conventionally, as described in the following patent document, a technique which reduces the number of operational amplifiers in the C/V conversion device has been proposed.

Patent Document 1: JP-A-2005-315824

Patent document 1 proposes the technique which measures the electrostatic capacitances of a plurality of different electrostatic capacitance elements using one operational amplifier.

To be more specific, carrier signals whose phases are shifted from each other by 90° are applied to the electrostatic capacitance elements which are objects to be measured, and all outputs of the electrostatic capacitance element are inputted to the operational amplifier. Then, by performing phase division processing with respect to the output signals of the operational amplifier using a synchronous detection circuit, detection signals of the electrostatic capacitances of the respective electrostatic capacitance elements are separated from each other.

Here, the above-mentioned technique which separates the signals based on the phase division processing can only separate two kinds of signals and hence, when it is necessary to simultaneously measure (detect) the electrostatic capacitances of three or more electrostatic capacitance elements, frequency separation processing which changes the frequencies of the applied carrier waves is used to cope with such a measurement.

However, when the electrostatic capacitances of three or more electrostatic capacitance elements are simultaneously measured (detected) using the technique described in patent document 1, for example, when the displacement of a mass in three axes consisting of an x axis and a y axis which constitute detection axes and a z axis which constitutes an oscillation axis is detected as in the case of a two-axis angular velocity sensor, it is necessary to provide a plurality of signal sources which differ in frequency.

In this manner, it is difficult to prevent the circuit from becoming complicated and large-sized with the provision of the plurality of signal sources.

SUMMARY OF THE INVENTION

Accordingly, it is an object of the present invention to provide an angular velocity sensor which can, after amplifying a plurality of detection signals using one amplifying circuit, properly separate these detection signals without providing a plurality of signal sources.

To achieve the above-mentioned object, according to a first aspect of the present invention, there is provided an angular velocity sensor including a frame having a hollow portion, a mass which is supported on the frame by way of resilient beams which are formed in the x-axis direction and the y-axis direction orthogonal to each other, has a thickness in the z-axis direction orthogonal to the x axis and the y axis respectively, wherein a surface portion of the mass functions as a movable electrode and changes a posture thereof corresponding to an external force, a plurality of fixed electrodes which is arranged to face the mass in an opposed manner, a first detection circuit which detects a change of electrostatic capacitance between the fixed electrode and the movable electrode along with the inclination of the mass in the y-axis direction, a second detection circuit which detects a change of electrostatic capacitance between the fixed electrode and the movable electrode along with the inclination of the mass in the x-axis direction, a third detection circuit which detects a change of electrostatic capacitance between the fixed electrode and the movable electrode along with displacement of the mass in the z-axis direction, a phase shifting means which shifts a phase of a carrier wave which is applied to the third detection circuit by 90° from a phase of a carrier wave which is applied to the first detection circuit and the second detection circuit, a switching means which alternately performs the application of carrier wave to the first detection circuit and the second detection circuit based on timing of a control clock signal by switching the application for every fixed cycle, an amplifying circuit to which output signals from the first detection circuit, the second detection circuit and the third detection circuit are inputted, a first separation means which separates an angular velocity component signal which is constituted of a first detection signal indicative of the change of the electrostatic capacitance in the first detection circuit and a second detection signal indicative of the change of the electrostatic capacitance in the second detection circuit and a third detection signal indicative of the change of the electrostatic capacitance in the third detection circuit from each other by performing phase division processing based on the timing of the control clock signal in response to the output signals from the amplifying circuit, a second separation means which separates the first detection signal and the second detection signals from each other by performing a time division processing based on switching timing of the carrier wave by the switching means in response to the angular velocity component signal, an angular velocity output means which outputs an angular velocity acting about the x axis of the mass in response to the first detection signal and outputs an angular velocity acting about the y axis of the mass in response to the second detection signal, and a driving means which oscillates the mass in the z-axis direction while performing a position control in response to the third detection signal.

According to the second aspect of the present invention, in the angular velocity sensor according to the first aspect of the present invention, the first detection circuit includes a circuit which is formed by connecting two electrostatic capacitance elements in series which change electrostatic capacitances symmetrically along with the inclination of the mass in the y-axis direction out of electrostatic capacitance elements which are constituted of the fixed electrode and the movable electrode, the second detection circuit includes a circuit which is formed by connecting two electrostatic capacitance elements in series which change electrostatic capacitances symmetrically along with the inclination of the mass in the x-axis direction out of electrostatic capacitance elements which are constituted of the fixed electrode and the movable electrode, the third detection circuit includes a circuit which is formed by connecting an electrostatic capacitance element which changes electrostatic capacitance along with the displacement of the mass in the z-axis direction and a specific electrostatic capacitance elements in series out of electrostatic capacitance elements which are constituted of the fixed electrode and the movable electrode, and the angular velocity sensor further includes a carrier wave applying means which applies carrier waves whose phases are inverted from each other by 180° to the respective electrostatic capacitance elements which are connected in series in the first detection circuit, the second detection circuit and the third detection circuit.

According to the third aspect of the present invention, in the angular velocity sensor according to the first aspect or the second aspect of the present invention, the second separation means, after a lapse of a predetermined time from the timing of switching of the carrier wave by the switching means, separates the first detection signal or the second detection signal.

According to the fourth aspect of the present invention, in the angular velocity sensor according to the first aspect of the present invention, the second aspect or the third aspect of the present invention, the fixed electrode includes four first electrodes which, using a center position of mass as a reference position, are arranged equidistantly around the reference position on the same plane, the first detection circuit includes a circuit in which a circuit which is formed by connecting an electrostatic capacitance element which is constituted of the first electrode positioned in a first quadrant on an x-y plane out of four first electrodes and the movable electrode and an electrostatic capacitance element which is constituted of a first electrode positioned in a second quadrant on the x-y plane out of four first electrodes and the movable electrode in parallel, and a circuit which is formed by connecting an electrostatic capacitance element which is constituted of the first electrode positioned in a fourth quadrant on an x-y plane out of four first electrodes and the movable electrode and an electrostatic capacitance element which is constituted of a first electrode positioned in a third quadrant on the x-y plane out of four first electrodes and the movable electrode in parallel are connected in series, and the second detection circuit includes a circuit in which a circuit which is formed by connecting the electrostatic capacitance element which is constituted of the first electrode positioned in the first quadrant on an x-y plane out of four first electrodes and the movable electrode and the electrostatic capacitance element which is constituted of the first electrode positioned in the fourth quadrant on the x-y plane out of four first electrodes and the movable electrode in parallel, and a circuit which is formed by connecting the electrostatic capacitance element which is constituted of the first electrode positioned in the third quadrant on the x-y plane out of four first electrodes and the movable electrode and the electrostatic capacitance element which is constituted of the first electrode positioned in the second quadrant on the x-y plane out of four first electrodes and the movable electrode in parallel are connected in series, and the switching means switches wirings of the first detection circuit and the second detection circuit.

According to the fifth aspect of the present invention, in the angular velocity sensor according to the fourth aspect of the present invention, the fixed electrode further includes four second electrodes on a plane which face the four first electrodes in an opposed manner by way of the mass, the first detection circuit includes a circuit which connects an electrostatic capacitance element which is constituted of the second electrode positioned in the fourth quadrant on an x-y plane out of four second electrodes and the movable electrode and an electrostatic capacitance element which is constituted of the second electrode positioned in the third quadrant on the x-y plane out of four second electrodes and the movable electrode with an electrostatic capacitance element which is constituted of the first electrode positioned in the first quadrant on the x-y plane out of four second electrodes and the movable electrode in parallel, and connects an electrostatic capacitance element which is constituted of the second electrode positioned in the first quadrant on an x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the third quadrant on the x-y plane out of four second electrodes and the movable electrode in parallel, the second detection circuit includes a circuit which connects an electrostatic capacitance element which is constituted of the second electrode positioned in the first quadrant on the x-y plane out of four second electrodes and the movable electrode and an electrostatic capacitance element which is constituted of the second electrode positioned in the fourth quadrant on the x-y plane out of four second electrodes and the movable electrode with an electrostatic capacitance element which is constituted of the first electrode positioned in the third quadrant on the x-y plane out of four second electrodes and the movable electrode in parallel, and connects an electrostatic capacitance element which is constituted of the second electrode positioned in the third quadrant on the x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the first quadrant on the x-y plane out of four second electrodes and the movable electrode in parallel.

According to the sixth aspect of the present invention, in the angular velocity sensor according to any one of the first aspect to the fifth aspect of the present invention, the first separation means, after a lapse of a predetermined time from the timing at which the carrier waves are switched by the switching means, separates the third detection signal.

According to the seventh aspect of the present invention, in the angular velocity sensor according to the third aspect or the sixth aspect of the present invention, the predetermined time is set to a value which falls within a range from 3 to 4 T from the timing at which the carrier waves are switched by the switching means.

According to the present invention with the use of the combination of the phase division processing and the time division processing, it is possible to properly perform the separation processing of the combined signals after amplification. Accordingly, it is possible to simultaneously perform the amplifying processing of the output of the first detection circuit, the output of the second detection circuit and the output of the third detection circuit using one amplifying circuit.

BRIEF DESCRIPTION OF THE DRAWINGS

FIG. 1 is a perspective view showing the schematic structure of a sensor part of an angler velocity sensor according to an embodiment of the present invention;

FIG. 2A to FIG. 2C are views showing a movable part structural body, wherein FIG. 2A is a plan view as viewed from an upper glass substrate side, FIG. 2B is a view showing a cross section of the angular velocity sensor taken along a line A-A' in FIG. 2A, and FIG. 2C is a view showing a state in which a posture of a mass is changed;

FIG. 16 is a timing chart showing signal waveforms in respective parts of a C/V conversion circuit of a fourth modification.

DESCRIPTION OF THE PREFERRED EMBODIMENTS

Figure 2A:
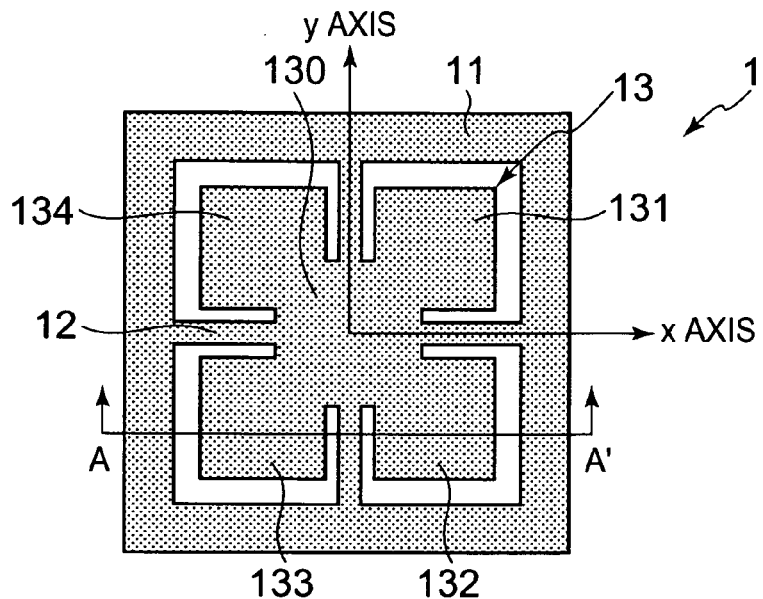

Hereinafter, a preferred embodiment of the present invention is explained in detail in conjunction with FIG. 1 to FIG. 16.

(1) Abstract of the Embodiment

The embodiment of the present invention is directed to an angular velocity sensor which detects the displacement of a posture state of a mass which is supported on a frame using resilient beams based on a change amount of an electrostatic capacitance between a fixed electrode and a movable electrode (mass), and measures an angular velocity acting on the mass based on a detection result of the displacement of the posture state of the mass.

The angular velocity sensor according to this embodiment detects inclinations in the x-axis direction and the y-axis direction when a Coriolis force which is generated by an angular velocity applied to the mass oscillating in the z-axis direction acts on the mass using a y-axis detection circuit and an x-axis detection circuit.

The angular velocity sensor includes a drive circuit for driving the mass in an oscillating manner with a fixed frequency, and also includes a z-axis detection circuit which detects the displacement of the mass in the z-axis direction which becomes necessary at the time of performing a positional control of the mass to control the drive circuit.

As a carrier wave which is applied to the x axis detection circuit and the y axis detection circuit, a carrier wave which has a phase thereof shifted from a phase of the carrier wave applied to the z-axis detection circuit by 90° is used.

Further, the application of the carrier wave to the x-axis detection circuit and the y-axis detection circuit is alternately performed by switching for every fixed cycle in accordance with the timing at which a specific clock signal is inputted.

Outputs of the x-axis detection circuit, the y-axis detection circuit and the z-axis detection circuit are collectively inputted into a current/voltage conversion circuit in which amplification-and-conversion processing is applied.

An output signal (combined signal) of the current/voltage conversion circuit is inputted to three synchronous detection circuits, wherein in the respective synchronous detection circuits, an x-axis detection signal component (a first detection signal component), a y-axis detection signal component (a second detection signal component) and a z-axis detection signal component (a third detection signal component) are separated and extracted.

In the synchronous detection circuit, by applying a specific phase division processing to the combined signal, the z-axis detection signal component is separated from the x-axis detection signal component and the y-axis detection signal component and further, by applying time division processing to the x-axis detection signal component and the y-axis detection signal component in accordance with switching timing of the carrier wave, that is, in response to the clock signal, the x-axis detection signal component and the y-axis detection signal component are separated from each other.

The angular velocity acting about the x axis is detected based on the x-axis detection signal component separated in the synchronous detection circuit, while the angular velocity acting about the y axis is detected based on the y-axis detection signal component separated in the synchronous detection circuit.

Further, the displacement of the mass in the z-axis direction is detected based on the z-axis detection signal component, and a primary oscillation drive control of the mass is performed based on the detection result of the displacement of the mass.

In this manner, according to the embodiment, the detection signal components in the respective axis directions can be separated by applying the phase division processing and the time division processing in a combined manner to the combined signal after the amplification in the synchronous detection circuits and hence, it is possible to simultaneously perform the amplifying processing of the output of the x-axis detection-circuit, the output of the y-axis detection circuit and the output of the z-axis detection circuit using one current/voltage conversion circuit.

(2) Detail of the Embodiments

The angular velocity sensor according to this embodiment is a semiconductor sensor element which is prepared by forming a semiconductor substrate. Here, the semiconductor substrate may be formed by using an MEMS (microelectro-mechanical-system) technique.

Here, the direction equal to the stacking direction of respective layers in the substrate which constitutes the angular velocity sensor is defined as the vertical direction, that is, z axis (direction). Further, axes which are orthogonal to the z axis and are orthogonal to each other are defined as the x axis (direction) and the y axis (direction). That is, the x axis, the y axis and the z axis constitute three axes which are orthogonal to each other.

Further, the angular velocity sensor according to this embodiment includes a sensor part which detects the change of the posture of the mass as the electric signals and a signal processing part (a control part) which processes the detected electric signals.

Here, the explanation is made by dividing the angular velocity sensor into the sensor part and the signal processing part (the control part).

FIG. 1 is a perspective view showing the schematic structure of the sensor part in the angler velocity sensor according to this embodiment of the present invention.

Here, in FIG. 1, to express the structure of the angular velocity sensor in an easily understandable manner, the structures of the respective layers are expressed in a separated manner. However, in the actual angular velocity sensor, the respective layers are constituted in a stacked state.

As shown in FIG. 1, the angular velocity sensor adopts the three-layered structure in which a movable part structural body 1 is sandwiched by an upper glass substrate 2 and the lower glass substrate 3 in the vertical direction.

FIG. 2A is a plan view of the movable part structural body 1 as viewed from the upper glass substrate 2 side.

As shown in the drawing, the movable part structural body 1 is constituted of a frame 11, beams 12 and a mass 13 which are formed by etching a silicon substrate.

The frame 11 is a fixed part formed on a peripheral portion of the movable part structural body 1 such that the frame 11 surrounds the mass 13, and constitutes a frame work of the movable part structural body 1.

The beams 12 are formed of four stripe-like thin members which extend in the radial direction (in the direction toward the frame 11) and the crucifix direction from the center of the mass 13 and has resiliency.

The mass 13 is constituted of a prism-like mass portion 130 which is positioned at a center portion and prism-like mass portions 131 to 134 which are arranged at four corners of the mass portion 130 respectively in a well-balanced manner. Here, the mass portions 130 to 134 are formed as an integral continuous solid body.

The mass 13 is a mass body which is fixed to the frame 11 using four beams 12. The mass 13 is capable of being oscillated or twisted by a force applied from the outside due to an action of the beams 12. The mass 13 is electrically conductive and side surfaces of the mass 13 function as movable electrodes.

Figure 2B:
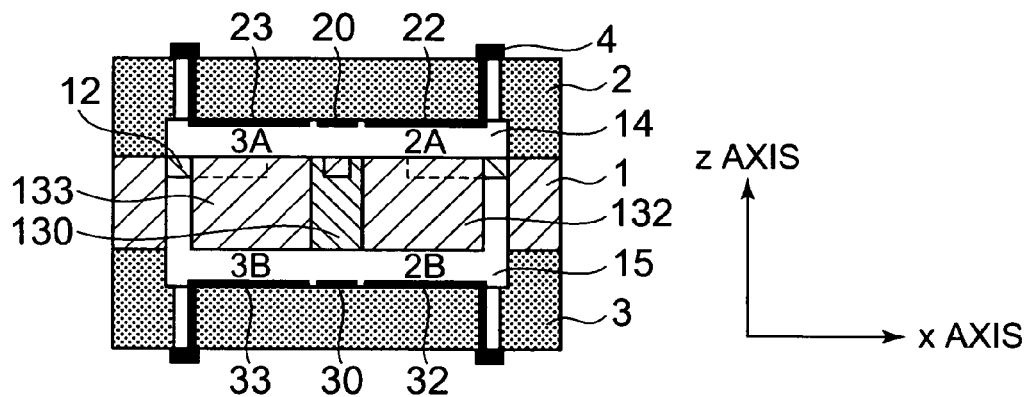

FIG. 2B is a view showing a cross section of the angular velocity sensor taken along a line A-A' in FIG. 2A.

As shown in the drawing, between upper surfaces of the beams 12 and the mass 13 (surfaces which face the upper glass substrate 2 in an opposed manner) and the upper glass substrate 2, a movement allowing gap 14 which allows the movement of the mass 13 is formed. The upper glass substrate 2 is bonded to the lower glass substrate 3 to seal the movement allowing gap 14.

Also between a lower surface of the beams 12 (a surface which faces the lower glass substrate 3 in an opposed manner) and a bottom surface, that is, a lower surface of the mass 13 (a surface which faces the lower glass substrate 3 in an opposed manner) and the lower glass substrate 3, and also on a peripheral portion of the mass 13, a movement allowing gap 15 which allows the movement of the mass 13 is formed. The lower glass substrate 3 is bonded to the upper glass substrate 2 to seal the movement allowing gap 15. Here, by evacuating the movement allowing gaps 14, 15 into a vacuum state, it is possible to reduce air resistance when the mass 13 is operated.

Here, the frame 11, the beams 12 and the mass 13 of the movable part structural body 1 may be formed by making use of a D-RIE (Deep-Reactive Ion Etching) technique which applies deep trench etching to a silicon substrate using plasma.

Further, in the angular velocity sensor according to this embodiment, the movable part structural body 1 is formed using the silicon substrate. However, a member for forming the movable part structural body 1 is not limited to such a silicon substrate. For example, the movable part structural body 1 may be formed using a SOI (a Silicon On Insulator) substrate which embeds an oxide film in an intermediate layer of a silicon substrate.

In this case, in forming the beams 12 and the mass 13 by etching, the intermediate oxide film layer functions as an etching interruption layer (stop layer) and hence, the forming accuracy in the thickness direction can be enhanced.

The upper glass substrate 2 and the lower glass substrate 3 are fixed substrates which are bonded to seal the movable part structural body 1 therebetween. The upper glass substrate 2 and the lower glass substrate 3 are respectively bonded to the frame 11 of the movable part structural body 1 by anodic bonding.

The anodic bonding is a bonding method in which a cathode voltage is applied to the glass substrate (the upper glass substrate 2, the lower glass substrate 3) side and the upper glass substrate 2 and the lower glass substrate 3 are bonded to the frame 11 by making use of an electrostatic attraction between glass and silicon.

Here, the bonding method of the glass substrates and the movable part structural body 1 is not limited to the anodic bonding. For example, it may be possible to use eutectic bonding which performs bonding by laminating metal to a bonding surface.

On the upper glass substrate 2 and the lower glass substrate 3, a drive electrode for driving the mass 13 in an oscillating manner and a plurality of fixed electrodes for detecting a posture state of the mass 13 are mounted.

Figure 3:
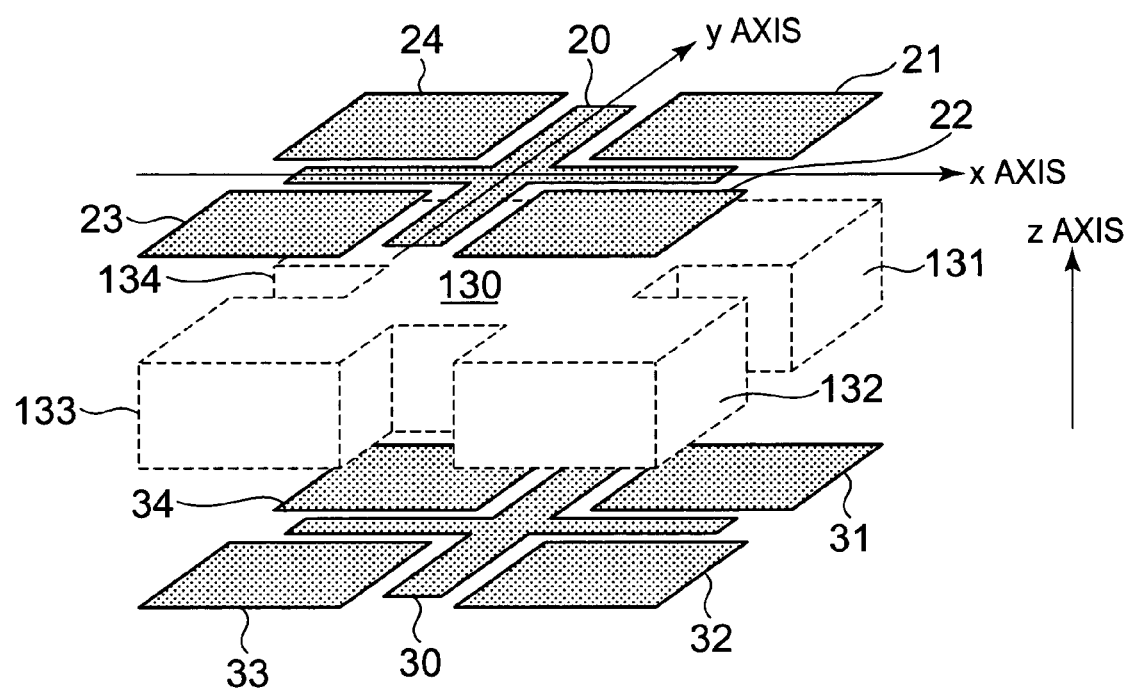
FIG. 3 is a view showing an arrangement state of fixed electrodes and a drive electrode which are mounted on the angler velocity sensor.

FIG. 3 is a view showing an arrangement state of the fixed electrodes and the drive electrode which are provided to the angler velocity sensor.

Here, in FIG. 3, only the electrodes and the mass 13 are shown to clarify the arrangement relationship between the respective electrodes and the mass 13.

As shown in FIG. 3, on the upper glass substrate 2, at a portion which faces the mass portion 130 in an opposed manner, a fixed electrode 20 which extends in the crucifix direction along the x-axis direction and the y-axis direction about the mass portion 130 is mounted.

Further, on the upper glass substrate 2, a fixed electrode 21 is mounted at a portion which faces the mass portion 131 in an opposed manner (a first quadrant on an x-y plane), a fixed electrode 22 is mounted at a portion which faces the mass portion 132 in an opposed manner (a fourth quadrant on the x-y plane), a fixed electrode 23 is mounted at a portion which faces the mass portion 133 in an opposed manner (a third quadrant on the x-y plane), and a fixed electrode 24 is mounted at a portion which faces the mass portion 134 in an opposed manner (a second quadrant on the x-y plane).

In the same manner, on the lower glass substrate 3, at a portion which faces the mass portion 130 in an opposed manner, a drive electrode 30 which extends in the crucifix direction along the x-axis direction and the y-axis direction about the mass portion 130 is mounted.

Further, on the lower glass substrate 3, a fixed electrode 31 is mounted at a portion which faces the mass portion 131 in an opposed manner, a fixed electrode 32 is mounted at a portion which faces the mass portion 132 in an opposed manner, a fixed electrode 33 is mounted at a portion which faces the mass portion 133 in an opposed manner, and a fixed electrode 34 is mounted at a portion which faces the mass portion 134 in an opposed manner.

The fixed electrode 20 is an electrode for detecting the displacement of the mass 13 in the z-axis direction, while the drive electrode 30 is an electrode for driving the mass 13 in an oscillating manner.

Further, the fixed electrodes 21 to 24 and the fixed electrodes 31 to 34 are electrodes for detecting angular velocities which act about the first detection axis (the x axis) or the second detection axis (the y axis).

In the angular velocity sensor according to this embodiment, a capacitor (an electrostatic capacitance element) 1A is constituted of the fixed electrode 21 and the movable electrode (the mass 13), a capacitor 2A is constituted of the fixed electrode 22 and the movable electrode, a capacitor 3A is constituted of the fixed electrode 23 and the movable electrode, and a capacitor 4A is constituted of the fixed electrode 24 and the movable electrode.

In the same manner, a capacitor 1B is constituted of the fixed electrode 31 and the movable electrode, a capacitor 2B is constituted of the fixed electrode 32 and the movable electrode, a capacitor 3B is constituted of the fixed electrode 33 and the movable electrode, and a capacitor 4B is constituted of the fixed electrode 34 and the movable electrode.

Further, a capacitor ZA is constituted of the fixed electrode 20 and the movable electrode, while a capacitor ZB is constituted of the drive electrode 30 and the movable electrode.

Here, on the upper glass substrate 2 and the lower glass substrate 3, as shown in FIG. 1 and FIG. 2B, a plurality of electrode pads 4 for leading potentials of the respective electrodes and a potential of the mass 13, that is, signals detected by the sensor part to the outside of the sensor part are mounted.

The electrode pads 4 are connected with the respective electrodes via lead lines which are formed on inner peripheral walls of through holes which penetrate the respective glass substrates in the thickness direction.

Further, these electrode pads 4 are connected to a C/V conversion circuit in the inside of a signal processing part (a control part) described later.

Next, the manner of operation of the sensor part of the angular velocity sensor having such a constitution is explained.

The angular velocity sensor according to this embodiment adopts a method in which, as shown in FIG. 1, the mass 13 is subjected to the primary oscillation in the vertical direction (z-axis direction) thus generating a Coriolis force in the mass 13 which is performing the oscillating movement, and the angular velocities which are applied to the mass 13 about the first detection axis (the x axis) and the second detection axis (the y axis).

To be more specific, an AC voltage is applied between the drive electrode 30 and the movable electrode (the mass 13), that is, to the capacitor ZB thus oscillating the mass 13 in the vertical direction (the z-axis direction) using an action of the electrostatic force which acts between these electrodes.

Here, in the angular velocity sensor according to this embodiment, the drive processing which applies the AC voltage to the capacitor ZB is executed using a feedback control based on a detection result of a change of posture of the mass 13 in the z-axis direction, that is, a detection result of a change of the electrostatic capacitance of the capacitor ZA.

The frequency of the AC voltage applied to make the mass 13 perform the vertical oscillation, that is, the oscillation frequency of the mass 13 is set to a resonance frequency f of approximately 3 KHz which induces the resonance oscillation of the mass 13, for example. In this manner, by oscillating the mass 13 with the resonance frequency f, it is possible to obtain the large displacement quantity of the mass 13.

When the angular velocity $\Omega$ is applied to the periphery of the mass 13 having a mass m which is oscillated at a speed v, a Coriolis force of "F=2 mv$\Omega$" is generated in the direction orthogonal to the direction of movement of the mass 13 about the mass 13.

When such a Coriolis force F is generated, a twist is applied to the mass 13 and hence, the posture of the mass 13 is changed. That is, the mass 13 is inclined with respect to a surface orthogonal to the direction of movement of the oscillation of the mass 13. The direction and the magnitude of the angular velocity acting on the mass 13 can be detected by detecting the change (inclination, twisting quantity) of the posture of the mass 13.

Figure 2C:
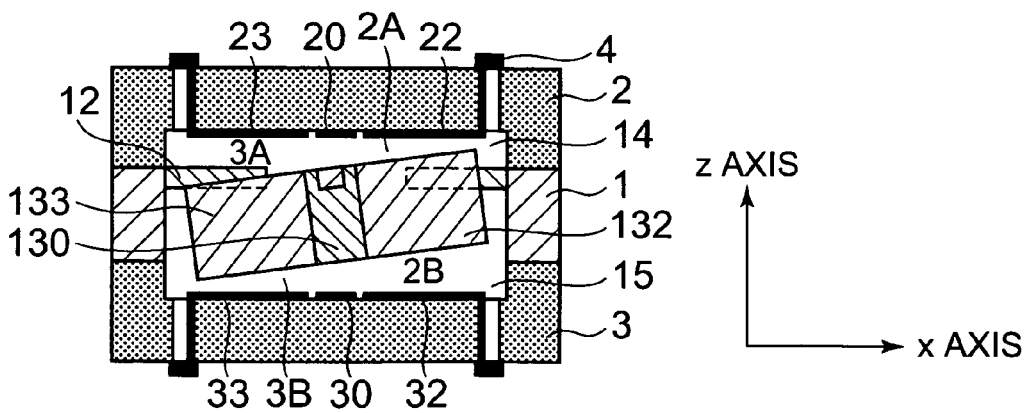

FIG. 2C is a view showing a state in which the posture of the mass 13 is changed.

For example, when the angular velocity acts about the second detection axis (y axis) of the mass 13 thus generating a Coriolis force and, as shown in FIG. 2C, the posture of the mass 13 is inclined with respect to the x axis, the distance between the fixed electrode and the movable electrode (the mass 13) is changed.

To be more specific, the distance between the fixed electrode 22 and the movable electrode and the distance between the fixed electrode 33 and the movable electrode are decreased, while the distance between the fixed electrode 32 and the movable electrode and the distance between the fixed electrode 23 and the movable electrode are increased.

Such a change of the distance between the electrodes appears as a change of the electrostatic capacitance between electrodes and hence, it is possible to detect the change of the posture of the mass 13 based on the change of the electrostatic capacitance between the capacitors 2A, 3A and between the capacitors 2B, 3B.

The change of distance between the electrodes, that is, the change of the electrostatic capacitance between the electrodes can be electrically detected using the C/V conversion circuit in the signal processing part (the control part) explained later.

Based on the detected change of the posture (inclination direction, the degree of inclination or the like) of the mass 13, the generated Coriolis force F is detected. Then, based on the detected Coriolis force F, the angular velocity Ω is calculated (induced). That is, in the signal processing part, the change quantity of the posture of the mass 13 is converted into the angular velocity.

Here, although the explanation has been made with respect to the case in which the angular velocity acts about the second detection axis (y axis) of the mass 13, it is possible to measure the acting angular velocity by detecting the change of the posture of the mass 13 based on the change of the distance between the fixed electrode and the movable electrode in the same manner as the case in which the angular velocity acts about the first detection axis (x axis) of the mass 13.

Next, a signal processing part (a control part) which processes signals detected by the sensor part of the angular velocity sensor of this embodiment is explained.

Figure 4:
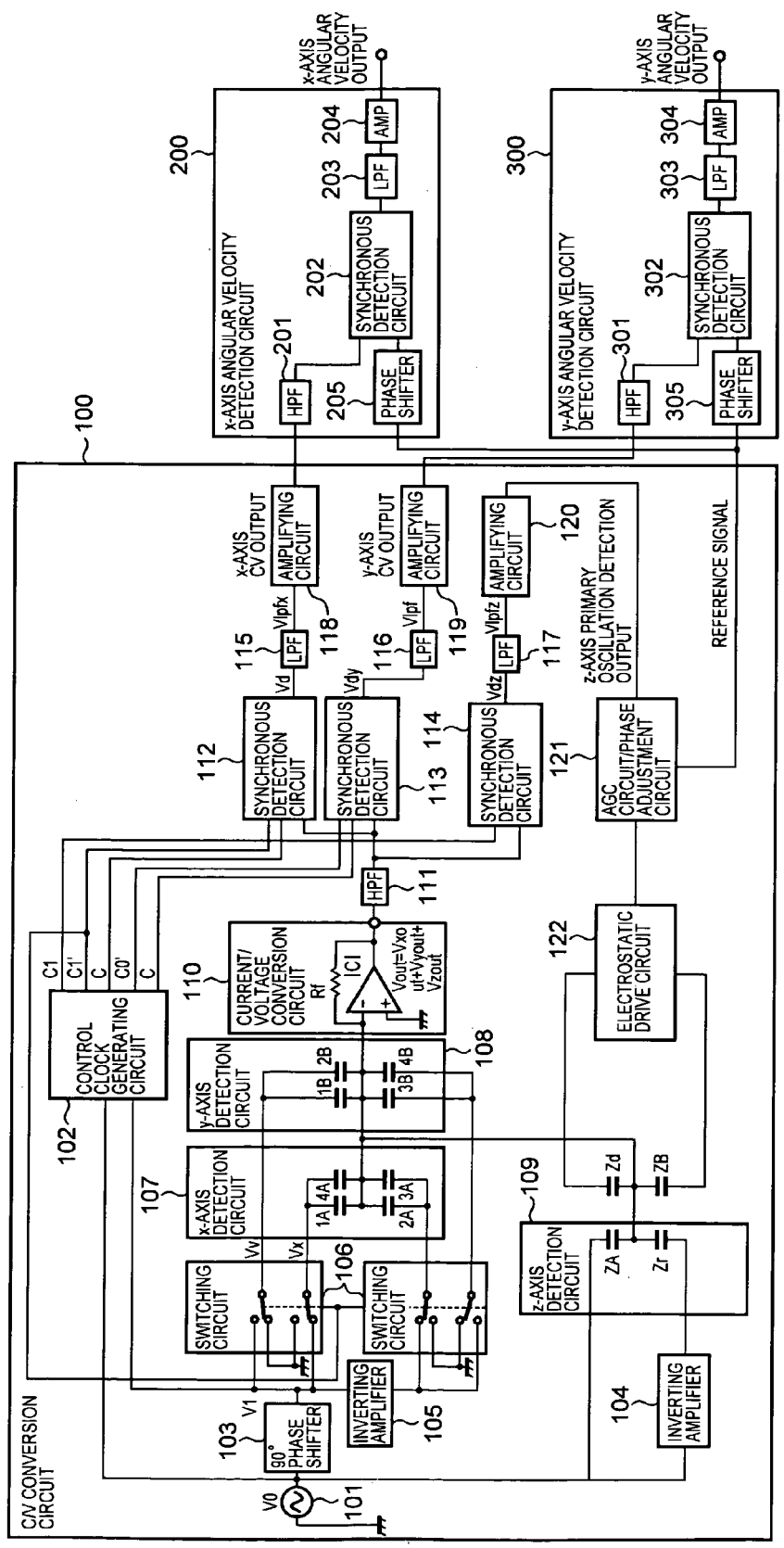
FIG. 4 is a circuit block diagram showing the schematic structure of a signal processing part (a control part) of the angler velocity sensor according to this embodiment of the present invention.

FIG. 4 is a circuit block diagram showing the schematic structure of the signal processing part (the control part) of the angular velocity sensor of this embodiment.

As shown in FIG. 4, the signal processing part includes a C/V conversion circuit 100, an x-axis angular velocity detection circuit 200, and a y-axis angular velocity detection circuit 300.

In the signal processing part of the angular velocity sensor, the detection signals in the respective axial directions which are processed in the C/V conversion circuit 100 are, after being processed in the x-axis angular velocity detection circuit 200 and the y-axis angular velocity detection circuit 300, finally outputted from the angular velocity sensor as an x-axis angular velocity output and a y-axis angular velocity output.

In the C/V conversion circuit 100, a change of distance between the fixed electrode and the movable electrode (the mass 13) in the sensor part, that is, the displacements of the mass 13 in the respective axial directions are detected based on changes of electrostatic capacitances of the capacitors and are converted into detection signals having voltage values (magnitudes) which correspond to respective axial components.

A first stage of the C/V conversion circuit 100 is constituted of a current/voltage (I/V) conversion circuit 110 which adopts a differential capacitance detection method.

Here, the differential capacitance detection method is a method in which the carrier waves whose phases are respectively inverted to each other by 180° are applied to both sides of the capacitors which are connected in series and a current signal indicative of a differential between the electrostatic capacitances of both capacitors is taken from a node of the capacitors and is inputted to an inverting amplifier circuit thus obtaining a voltage signal which is proportional to the differential between the electrostatic capacitances.

As shown in FIG. 4, the C/V conversion circuit 100 includes an AC voltage source 101 which generates high frequency signals (carrier wave signals), wherein the AC voltage source 101 is connected to a control clock generating circuit 102, a 90° phase shifter 103, one end of the capacitor ZA and the inverting amplifier 104 respectively.

Another end of the 90° phase shifter 103 is connected to the control clock generating circuit 102, a switching circuit 106 and the inverting amplifier 105 respectively.

The C/V conversion circuit 100 includes an x-axis detection circuit 107 which detects the displacement of the mass 13 about the x-axis of the mass 13, a y-axis detection circuit 108 which detects the displacement of the mass 13 about the y-axis of the mass 13, and a z-axis detection circuit 109 which detects the displacement of the mass 13 about the z-axis of the mass 13.

The x-axis detection circuit 107 includes capacitors 1A to 4A which are constituted of the fixed electrodes 21 to 24 (FIG. 3) which are mounted on an upper glass substrate 2 and the movable electrode.

To be specific, using the x-axis (a first detection axis) as a boundary, the capacitors 1A to 4A are divided into two groups, wherein one group is constituted of the capacitors 1A and 4A and another group is constituted of capacitors 2A and 3A. Here, the capacitors in the same group are connected in parallel to each other. Then, the capacitors in respective groups are connected in series.

The x-axis detection circuit 107 is configured such that the carrier waves whose phases are inverted from each other by 180° are applied to both ends of the x-axis detection circuit 107, that is, both ends of the capacitors which are connected in series.

In the same manner, the y-axis detection circuit 108 is constituted of capacitors 1B to 4B which are constituted of the fixed electrodes 31 to 34 (FIG. 3) which are mounted on a lower glass substrate 3 and the movable electrode.

To be specific, using the y-axis (a second detection axis) as a boundary, the capacitors 1B to 4B are divided into two groups, wherein one group is constituted of the capacitors 1B and 2B and another group is constituted of capacitors 3B and 4B. Here, the capacitors in the same group are connected in parallel to each other. Then, the capacitors in respective groups are connected in series.

The y-axis detection circuit 108 is configured such that the carrier waves whose phases are shifted from each other by 180° are applied to both ends of the x-axis detection circuit 107, that is, both ends of the capacitors which are connected in series.

The angular velocity sensor of this embodiment is configured such that the capacitors in which changing directions (inclinations) of the electrostatic capacitance when the posture of the mass 13 is changed become equal to each other are connected in parallel, and the capacitors in which changing directions (inclinations) of the electrostatic capacitance when the posture of the mass 13 is changed become symmetrical to each other are connected in series.

Further, the z-axis detection circuit 109 is constituted of a circuit in which the capacitor ZA which is constituted of the fixed electrode 20 mounted on the upper glass substrate 2 (FIG. 3) and the movable electrode and a preset reference capacitor Zr are connected in series.

The z-axis detection circuit 109 is configured such that carrier waves whose phases are shifted from each other by 180° are applied to both ends of the z-axis detection circuit 109, that is, both ends of the capacitors which are connected in series.

Here, the phase of the carrier wave applied to the x-axis detection circuit 107 and the y-axis detection circuit 108 is forcibly shifted from the phase of the carrier wave which is generated by the AC voltage source 101 by the 90° phase shifter 103 and hence, the carrier wave applied to the x-axis detection circuit 107 and the y-axis detection circuit 108 assumes a state in which the phase is shifted from the carrier wave applied to the z-axis detection circuit 109 by 90°.

The carrier wave which is applied to the x-axis detection circuit 107 and the y-axis detection circuit 108 is applied by alternately switching a circuit branch points in switching circuits 106 based on timing at which a specific control clock generated by the control clock generation circuit 102 (clock signal C1') is generated.

That is, by switching the connection points in the switching circuits 106, the carrier wave is alternately applied to the x-axis detection circuit 107 and the y-axis detection circuit 108.

During a period in which the carrier wave is applied to the x-axis detection circuit 107, both ends of the y-axis detection circuit 108 are connected to a ground potential and, in the same manner, during a period in which the carrier wave is applied to the y-axis detection circuit 108, both ends of the x-axis detection circuit 107 are connected to the ground potential.

In this manner, the switching circuit 106 has a function of distributing the input signal (carrier wave) into two outputs and is constituted of an analogue switch, for example.

The serial connection point of the capacitor in each detection circuit is connected to a current/voltage conversion circuit 110.

Then, when the carrier wave is applied to the x-axis detection circuit 107, the y-axis detection circuit 108 and the z-axis detection circuit 109, a current signal indicative of a differential between electrostatic capacitances of both capacitors connected in series is inputted to the current/voltage conversion circuit 110 from the series connection point of the capacitors in each detection circuit. The current/voltage conversion circuit 110 includes an operational amplifier IC1 and a resistance Rf.

The current signal outputted from each detection circuit is connected to an inverting input terminal (−) of the operational amplifier IC1. A non-inverting terminal (+) of the operational amplifier IC1 is connected (grounded) to a ground potential.

A resistance Rf which functions as a feedback resistance is connected between an output terminal and the inverting input terminal (−) of the operational amplifier IC1.

Here, the operational amplifier IC1 is constituted of an operational amplifier which constitutes an analogue integrated circuit.

The inverting input terminal (−) of the operational amplifier IC1 is a terminal which inverts a signal to be inputted thereto and outputs the signal after amplification. On the other hand, the non-inverting terminal (+) is a terminal which is not inverted by a signal which is inputted thereto and outputs the signal with amplification.

A gain of the operational amplifier is extremely high and the operational amplifier is capable of amplifying within a range of frequency characteristic of a DC current to several MHz.

Although not shown in the drawing, the operational amplifier IC1 includes a terminal of a power source and power for operation is supplied from this terminal.

An output terminal of the operational amplifier IC1 is connected to an HPF (high pass filter) 111. The HPF 111, out of the output signals of the operational amplifier IC1, allows a frequency component of the carrier wave generated by the AC voltage source 101 to pass therethrough and cuts signals having a frequency component lower than the frequency component of the carrier wave.

An output of the HPF 111 is connected to synchronous detection circuits 112, 113, 114 so as to allow the signals to be inputted respectively to the synchronous detection circuits 112, 113, 114.

The synchronous detection circuit 112 is constituted of a processing circuit which extracts (separates) the x-axis detection signal (Vdx) based on a signal component detected by the x-axis detection circuit 107.

The synchronous detection circuit 113 is constituted of a processing circuit which extracts (separates) the y-axis detection signal (Vdy) based on a signal component detected by the y-axis detection circuit 108.

The synchronous detection circuit 114 is constituted of a processing circuit which extracts (separates) the z-axis detection signal (Vdz) based on a signal component detected by the z-axis detection circuit 109.

Here, the synchronous detection circuits 112, 113, 114 respectively function as a first separation means and a second separation means is constituted of the synchronous detection circuits 112 and 113.

Respective outputs of the synchronous detection circuits 112 to 114 are connected to LPFs (low pass filters) 115 to 117. The LPFs 115 to 117 are constituted of a smoothing circuit which smoothes the output signals of the synchronous detection circuits 112 to 114.

The C/V conversion circuit 100 is configured such that a signal (a Vlpfx signal) smoothed by the LPF 115 is subjected to predetermined amplifying processing by the amplifying circuit 118 and, thereafter, the signal is outputted to the x-axis angular velocity detection circuit 200 as the x-axis CV output signal.

In the same manner, the C/V conversion circuit 100 is configured such that a signal (a Vlpfy signal) smoothed by the LPF 116 is subjected to predetermined amplifying processing by the amplifying circuit 119 and, thereafter, the signal is outputted to the y-axis angular velocity detection circuit 300 as the y-axis CV output signal.

Further, the C/V conversion circuit 100 is configured such that a signal (a Vlpfz signal) smoothed by the LPF. 117 is subjected to predetermined amplifying processing by the amplifying circuit 120 and, thereafter, the signal is outputted to an AGC (Automatic Gain Control) circuit/phase adjustment circuit 121.

Then, the signal which is processed by the AGC circuit/phase adjustment circuit 121 is outputted to an electrostatic drive circuit 122.

The AGC circuit/phase adjustment circuit 121 and the electrostatic drive circuit 122 is control circuits for performing self-exciting driving of the primary oscillation of the z axis in the mass 13, wherein in response to signals which are processed by these circuits, a drive control voltage which is applied to a preset reference capacitor Zd which is connected to the electrostatic drive circuit 122 and a capacitor ZB which is constituted of the drive electrode 30 (FIG. 3) mounted on the lower glass substrate 3 and the movable electrode is adjusted.

In the x-axis angular velocity detection circuit 200, the signal which is outputted from the amplifying circuit 118 as the x-axis CV output signal has a high frequency component thereof cut by the HPF 201 and, thereafter, specific detection processing is applied to a reference signal outputted from the AGC circuit/phase adjustment circuit 121 in the synchronous detection circuit 202 based on a signal whose phase is shifted by a phase shifter 205.

Then, after performing the smoothing processing of the signal in the LPF 203, the amplification processing is applied to the signal in an AMP (amplifying circuit) 204, and the signal is outputted to the angular velocity sensor as the x-axis angular velocity output signal.

In the same manner, in the y-axis angular velocity detection circuit 300, the signal which is outputted from the amplifying circuit 119 as the y-axis CV output signal has a high frequency component thereof cut by the HPF 301 and, thereafter, specific detection processing is applied to a reference signal outputted from the AGC circuit/phase adjustment circuit 121 in the synchronous detection circuit 302 based on a signal whose phase is shifted by a phase shifter 305.

Then, after performing the smoothing processing of the signal in the LPF 303, the amplification processing is applied to the signal in an AMP (amplifying circuit) 304, and the signal is outputted from the angular velocity sensor as the y-axis angular velocity output signal.

Figure 5:
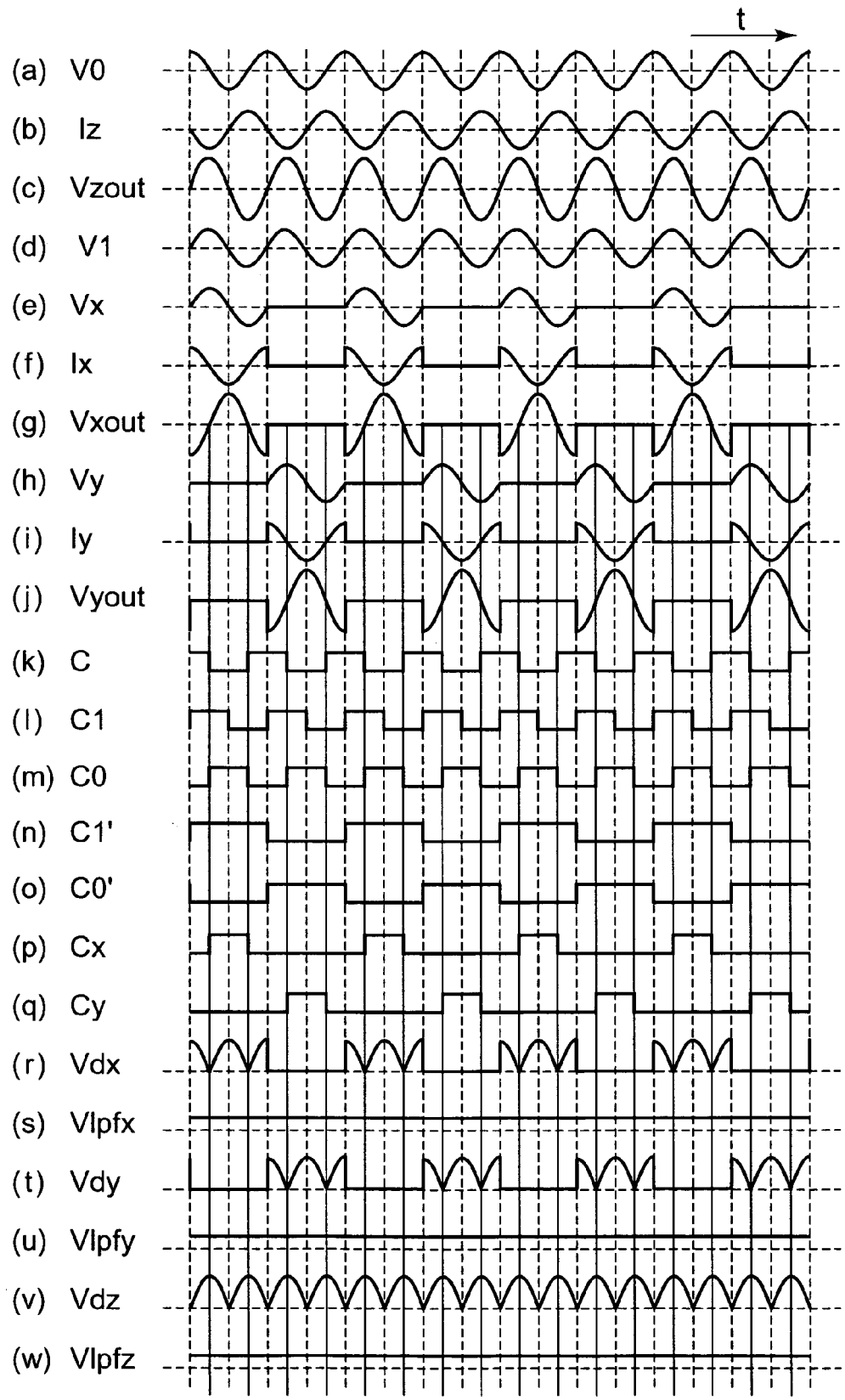
FIG. 5 is a timing chart showing signal waveforms in respective parts of a C/V conversion circuit.

Next, steps of signal processing which are executed in the C/V conversion circuit 100 are explained. FIG. 5 is a timing chart showing signal waveforms in respective parts of the C/V conversion circuit 100.

Here, the signal processing in the C/V conversion circuit 100 is executed based on a cycle (frequency) of a V0 signal which is generated in the AC voltage source 101 shown in FIG. 5(a).

The V0 signal is applied to the capacitor ZA and a signal (V0 inversion signal) which is obtained by inverting a phase of the V0 signal by 180° is applied to the capacitor Zr so that a current Iz (current signal) shown in FIG. 5(b) is inputted into the current/voltage conversion circuit 110 from the z-axis detection circuit 109.

When the V0 signal passes through the phase shifter 103, a phase of the V0 signal is shifted by 90° thus forming a V1 signal shown in FIG. 5(d).

In the x-axis detection circuit 107, when a Vx signal shown in FIG. 5(e) is applied to the capacitors 1A, 4A and a signal (Vx inversion signal) which is obtained by inverting a phase of the Vx signal by 180° is applied to the capacitors 2A, 3A by alternately switching a connection point in a switching circuit 106 every one cycle of the V0 signal, a current Ix (current signal) shown in FIG. 5(f) is inputted into the current/voltage conversion circuit 110 from the x-axis detection circuit 107.

Here, switching of the connection point in the switching circuit 106 is executed based on timing that a clock signal C1' which is described later is inputted.

On the other hand, in the y-axis detection circuit 108, when a Vy signal shown in FIG. 5(h) is applied to the capacitors 1B, 2B and a signal (Vy inversion signal) which is obtained by inverting a phase of the Vy signal by 180° is applied to the capacitors 3B, 4B, a current Iy (current signal) shown in FIG. 5(i) is inputted into the current/voltage conversion circuit 110 from the y-axis detection circuit 108.

When the currents Ix, Iy and Iz are inputted into an IC1, the current/Voltage conversion circuit 110 executes processing which converts the currents to voltage values proportional to the currents.

Further, the current/voltage conversion circuit 110 outputs a combined signal (Vout signal) which is obtained by combining a Vxout signal shown in FIG. 5(g) which is obtained by converting the current Ix to a voltage, a Vyout signal shown in FIG. 5(j) which is obtained by converting the current Iy to a voltage and a Vzout signal shown in FIG. 5(c) which is obtained by converting the current Iz to a voltage.

Then, in the synchronous detection circuits 112 to 114, processing for extracting and separating detection signals indicative of respective axial components from the Vout signal is executed in response to various kinds of clock signals which are generated by the control clock generating circuit 102.

In the control clock generating circuit 102, clock signals C, C1, C0, C1', C0', Cx and Cy are generated.

The clock signal C is, as shown in FIG. 5(k), a signal which outputs a pulse during a period in which the V0 signal is positive (+).

The clock signal C1 is, as shown in FIG. 5(l), a signal which is obtained by shifting a phase of the clock signal C by 90°.

The clock signal C0 is, as shown in FIG. 5(m), a signal which is obtained by inverting a phase of the clock signal C by 180°.

The clock signal C1' is, as shown in FIG. 5(n), a signal which has a cycle twice as large as a cycle of the clock signal C1, that is, has a frequency half of the frequency of the clock signal C1.

The clock signal C0' is, as shown in FIG. 5(o), a signal which is obtained by inverting a phase of the clock signal C1' by 180°.

The clock signal Cx is a synchronous detecting signal of the Vxout signal. The clock signal Cx is, as shown in FIG. 5(p), a signal in which an ON-period of the clock signal C0 is provided only during an ON-period of the clock signal C1'.

The clock signal Cy is a synchronous detecting signal of the Vyout signal. The clock signal Cy is, as shown in FIG. 5(q), a signal in which an ON-period of the clock signal C0 is provided only during an ON-period of the clock signal C0'.

In the synchronous detection circuits 112 to 114, first of all, the separation processing of the Vzout signal is performed by a phase division method with respect to the Vout signal.

Here, the separation processing of the signal by the phase division method is explained.

Figure 9A:
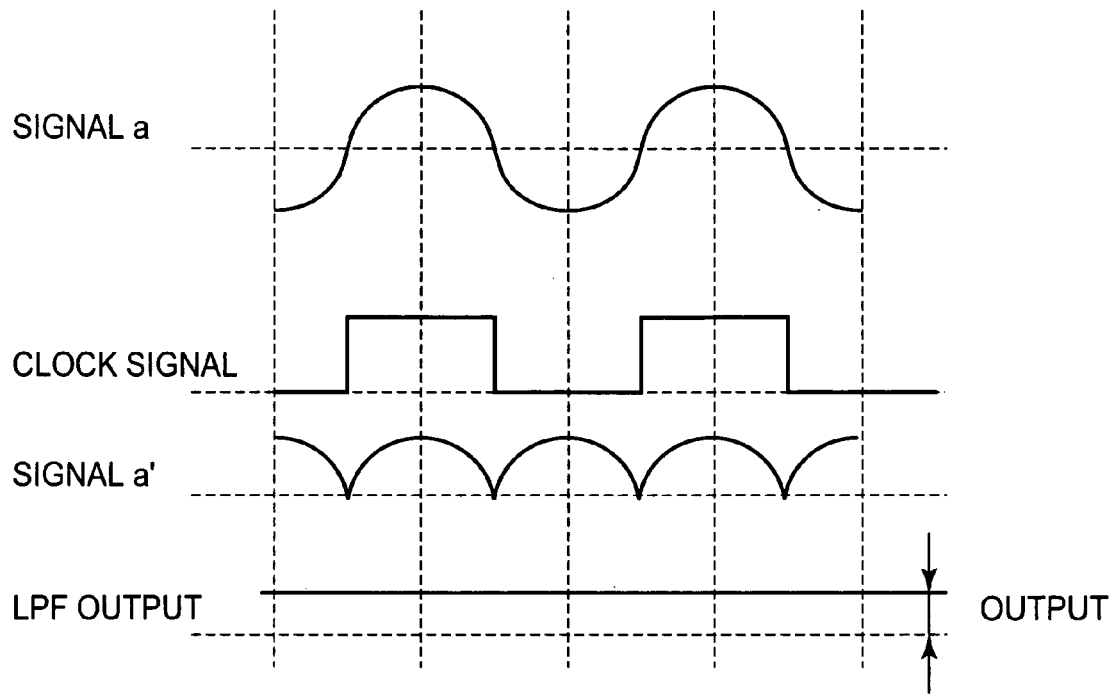
FIG. 9A and FIG. 9B are views for explaining a phase division method.
Figure 9B:
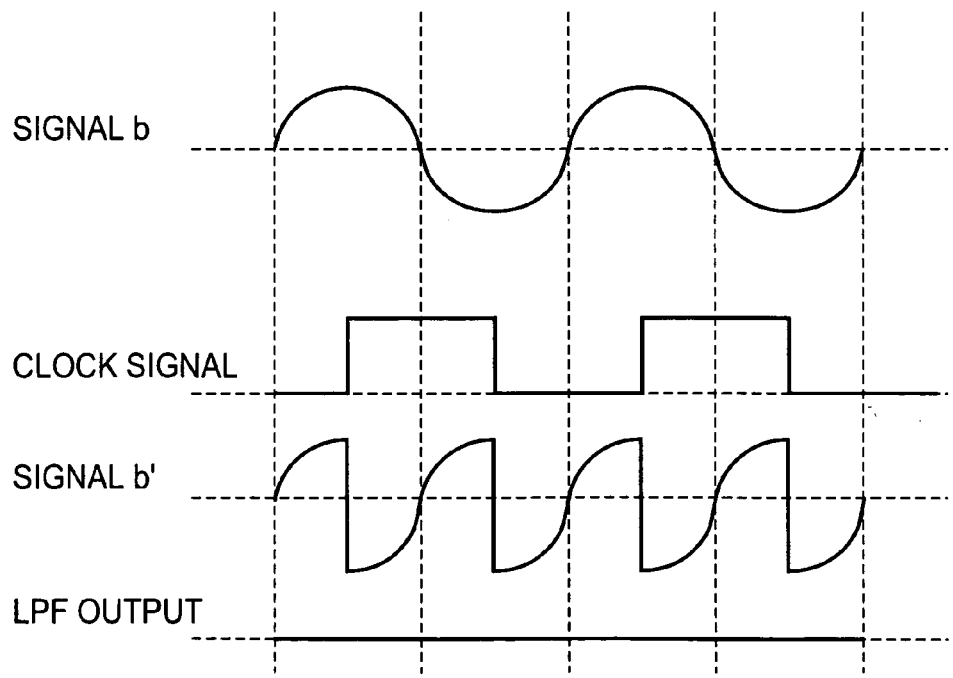

FIG. 9A and FIG. 9B are views for explaining the phase division method.

For example, as shown in FIG. 9A, using a clock signal which generates a pulse during a positive (+) period of a sinusoidal wave signal (signal a) which constitutes an object to be processed, the signal a is rectified only during an OFF period (Low period) of the clock signal so as to obtain a signal a'.

By applying the smoothing processing to the signal a' using the LPF, it is possible to obtain a DC output corresponding to amplitude (magnitude) of the signal a.

On the other hand, as shown in FIG. 9B, by rectifying a sinusoidal signal (signal b) whose phase is shifted from the signal a by 90° only during the OFF period (Low period) of the clock signal using a clock signal equal to the previous clock signal, it is possible to obtain a signal b'.

By applying the smoothing processing to the signal b' using the LPF, a positive (+) component and a negative (−) component of the signal B' are offset from each other and hence, the DC output becomes 0 (zero).

That is, by applying rectifying processing to a combined signal containing the signal a and the signal b whose phases are shifted by 90° from each other using the same clock signal and by smoothing the output, it is possible to obtain only the DC output corresponding to the magnitude of one signal (the signal (a) in this modification). Such a signal division (separation) method is referred to as a phase division method.

In the synchronous detection circuit 112, with the use of the above-mentioned phase division method, rectifying processing of the Vout signal is performed using a clock signal C and, thereafter, removal processing for removing the Vzout signal component from the Vout signal is performed.

Here, in this embodiment, the smoothing processing after rectification is executed by the LPFs 115 to 117 which are provided at a stage succeeding the synchronous detection circuits 112 to 114. However, to prevent the explanation of the smoothing processing from becoming cumbersome, with respect to the signal component which is finally removed after passing the LPFs 115 to 117, the explanation is made hereinafter in a state that the component is preliminarily removed.

Subsequently, in the synchronous detection circuit 112, the separation processing of the Vxout signal and the Vyout signal by the time division method is applied to the Vout' signal after removing the Vzout signal component.

To be more specific, while synchronizing the operational timing of the switching circuit 106, the processing for detecting (extracting) the signal of only at the timing (period) at which the carrier wave is applied to the x-axis detection circuit 107 in the Vout' signal is performed.

Due to such processing, it is possible to remove the Vyout signal component outputted from the current/voltage conversion circuit 110 at the timing (period) at which the carrier wave is applied to the y-axis detection circuit 108.

In this manner, in the synchronous detection circuit 112, the Vzout signal component and the Vyout signal component are removed from the Vout signal, that is, only the Vxout signal component is extracted.

A Vdx signal shown in FIG. 5(r) which is obtained by rectifying the Vxout signal is outputted from the synchronous detection circuit 112.

In the same manner, in the synchronous detection circuit 113, the rectifying processing of the Vout signal is performed using the clock signal C and, thereafter, the removal processing of the Vzout signal component from the Vout signal is performed.

Subsequently, in the synchronous detection circuit 113, the separation processing of the Vxout signal by the time division method is applied to the Vout' signal after removing the Vzout signal component.

To be more specific, while synchronizing the operational timing of the switching circuit 106, the processing for detecting (extracting) the signal of only at the timing (period) at which the carrier wave is applied to the y-axis detection circuit 108 in the Vout' signal is performed.

Due to such processing, it is possible to remove the Vxout signal component outputted from the current/voltage conversion circuit 110 at the timing (period) at which the carrier wave is applied to the x-axis detection circuit 107.

In this manner, in the synchronous detection circuit 113, the Vzout signal component and the Vxout signal component are removed from the Vout signal, that is, only the Vyout signal component is extracted.

A Vdy signal shown in FIG. 5(t) which is obtained by rectifying the Vyout signal is outputted from the synchronous detection circuit 113.

In the synchronous detection circuit 114, with the use of the above-mentioned phase division method, the rectifying processing of the Vout signal is performed using a clock signal C1 and, thereafter, the removal processing of the Vxout signal component and the Vyout signal component from the Vout signal is performed.

In the synchronous detection circuit 114, contrary to the synchronous detection circuits 112, 113, using the clock signal C1 whose phase is shifted from the phase of the clock signal C by 90°, it is possible to remove the Vxout signal component and the Vyout signal component which constitute the output signals of the x-axis detection circuit 107 and the y-axis detection circuit 108 to which the carrier wave whose phase is shifted from the carrier wave applied to the z-axis detection circuit 109 by 90°.

The Vdx signal which is outputted from the synchronous detection circuit 112 is subjected to the smoothing processing in the LPF 115 and is converted into the Vlpfx signal shown in FIG. 5(s).

In the same manner, the Vdy signal which is outputted from the synchronous detection circuit 113 is subjected to the smoothing processing in the LPF 116 and is converted into the Vlpfy signal shown in FIG. 5(u), while the Vdz signal which is outputted from the synchronous detection circuit 114 is subjected to the smoothing processing in the LPF 117 and is converted into the Vlpfz signal shown in FIG. 5(w).

In this manner, the current signals (Ix, Iy, Iz) of the x-axis detection circuit 107, the y-axis detection circuit 108 and the z-axis detection circuit 109 which are collectively inputted into one current/voltage conversion circuit 110, that is, the detection voltages (Vdx, Vdy, Vdz) corresponding to the detection signals can be properly separated for respective axis components.

In this manner, the angular velocity sensor of this embodiment is configured such that the difference (phase difference) between the phase of the carrier wave (carrier) applied to the x-axis detection circuit 107 and the y-axis detection circuit 108 and the phase of the carrier wave applied to the z-axis detection circuit 109 is set to 90° and, further, the carrier wave is alternately applied to the x-axis detection circuit 107 and the y-axis detection circuit 108.

Here, from the Vout signal which is the output of the current/voltage conversion circuit 110 containing the detection components of all detection axes (x axis, y axis, z axis), the z-axis detection component, the x-axis detection component and the y-axis detection component are separated by adopting the phase division method and, further, the x-axis detection component and the y-axis detection component are separated by adopting the time division method.

Accordingly, with the use of the combination of the phase division method and the time division method, it is possible to easily separate three signal components without using a complicated frequency modulation circuit or the like.

In this embodiment, the detection components in the respective axial directions for detecting the change of posture of the mass 13 are measured based on the change of the electrostatic capacitances between the fixed electrodes and the movable electrode (mass 13). Then, the displacement detection result which corresponds to the changes of the electrostatic capacitances in the respective axial directions can be properly separated for respective axial components.

Accordingly, the angular velocity sensor according to this embodiment can simultaneously detect the change of the posture of the mass 13 along the x axis, the y axis and the z axis.

In the angular velocity sensor according to this embodiment, the separation of the Vxout signal which is finally outputted as the detection signal of the x-axis angular velocity and the Vyout signal which is finally outputted as the detection signal of the y-axis angular velocity can be performed using the time division method and hence, the generation of a crosstalk (interference with cross axis) by the detection components in respective axial directions can be suppressed.

In this manner, according to this embodiment, in the two-axis-detection type angular velocity sensor, it is possible to provide the circuit which can suppress the generation of the crosstalk (interference with cross axis) between two axes having the angular velocity sensitivities and, at the same time, can simultaneously detect the displacement in the oscillation direction of the mass 13 with the small number of parts.

Further, in this embodiment, the separation of the Vzout signal which is outputted as the detection signal of the change of posture in the z-axis direction of the mass 13 from the Vxout signal and the Vyout signal is performed using the phase division method and hence, when the phase displacement (delay or advancement) attributed to a circuit error or an accuracy error is generated, the removal and separation of the Vzout signal which is an object to be removed or separated cannot be performed completely thus giving rise to a possibility that the Vzout signal component may be overlapped to other axial component.

However, the Vzout signal is provided for detecting the shift quantity (displacement quantity) from the reference position when the mass 13 is driven in an oscillating manner and hence, the Vzout signal does not contain the angular velocity sensitivity different from the Vxout signal and the Vyout signal.

Accordingly, for example, even when the component of the Vzout signal is overlapped to other axial component, the influence attributed to such overlapping can be made sufficiently small (or can be suppressed) compared to the influence of the crosstalk (interference with cross axis) generated when the axial components of the signals having the angular velocity sensitivities are separated using the phase division method.

(First Modification)

Next, the first modification of the above-mentioned angular velocity sensor is explained.

The first modification is characterized by a C/V conversion circuit 100 which is provided for suppressing the generation of crosstalk (interference with cross axis). That is, the C/V conversion circuit 100 performs processing which includes a non-detection time in time division in which a Vxout signal and a Vyout signal which are formed by division using a time division method are not detected (extracted).

In the above-mentioned time division processing shown in FIG. 5, the Vyout signal is outputted during an OFF period of the Vxout signal, and the Vxout signal is outputted during an OFF period of the Vyout.

Figure 10:
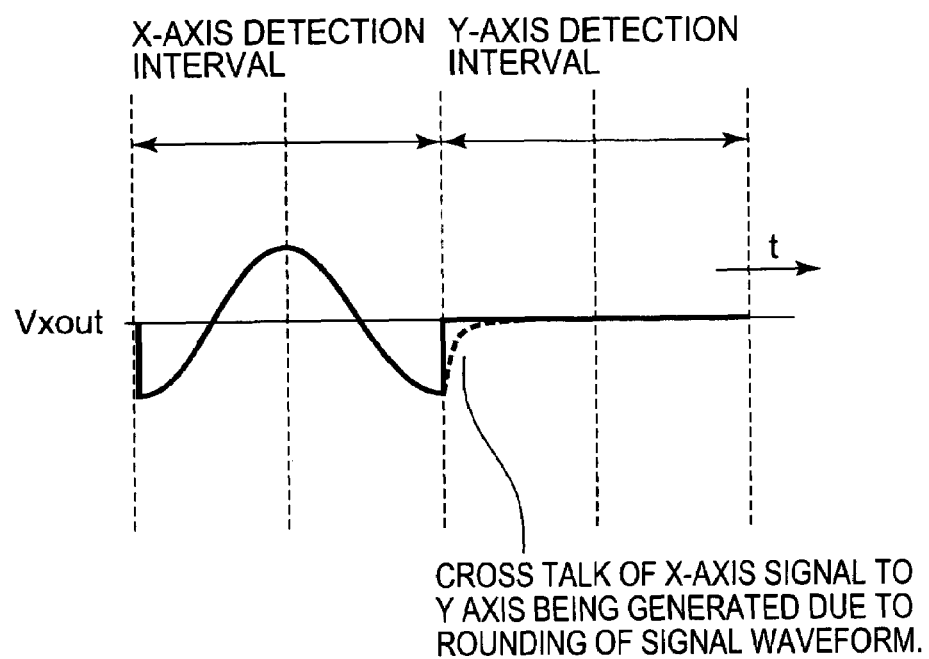
FIG. 10 is a view showing rounding of signal waveforms.

However, when a response possible band of a current/volume conversion circuit 110 is insufficient, for example, when a limit of a high frequency band is restricted to a low value, as shown in FIG. 10, signal waveform becomes rounded thus giving rise to a possibility that a signal is generated during the OFF period.

Such a signal generated during the OFF period directly becomes a crosstalk (interference with cross axis) component and hence, detection accuracy (detection sensitivity) of the angular velocity is lowered.

Accordingly, the first modification is directed to the method which can suppress the crosstalk (interference with cross axis) between the Vxout signal and the Vyout signal which is subjected to the time division processing.

Figure 6:
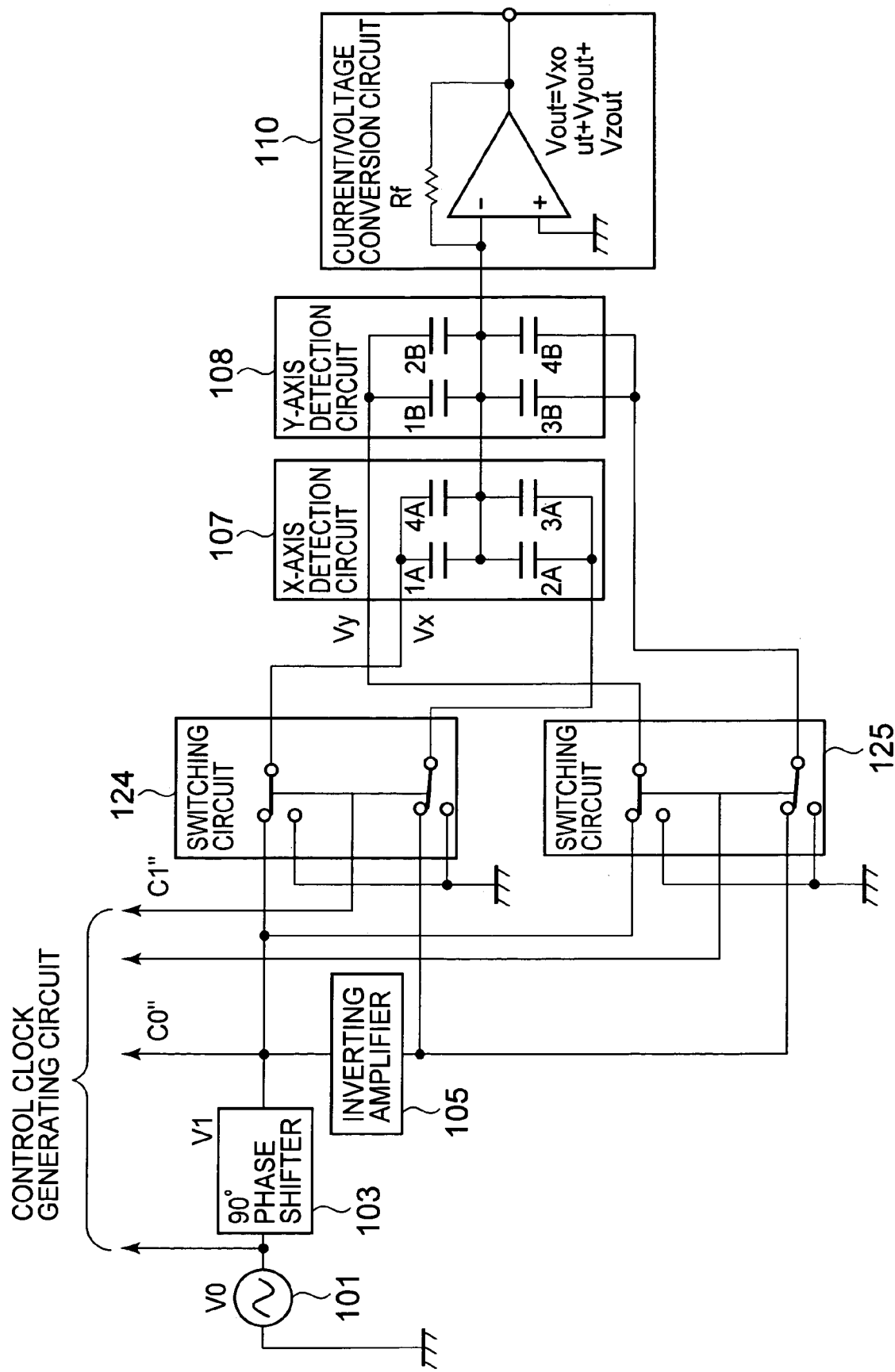
FIG. 6 is a circuit block diagram showing a first modification of a C/V conversion circuit.

FIG. 6 is a circuit block diagram showing the C/V conversion circuit 100 of the first modification.

Figure 7:
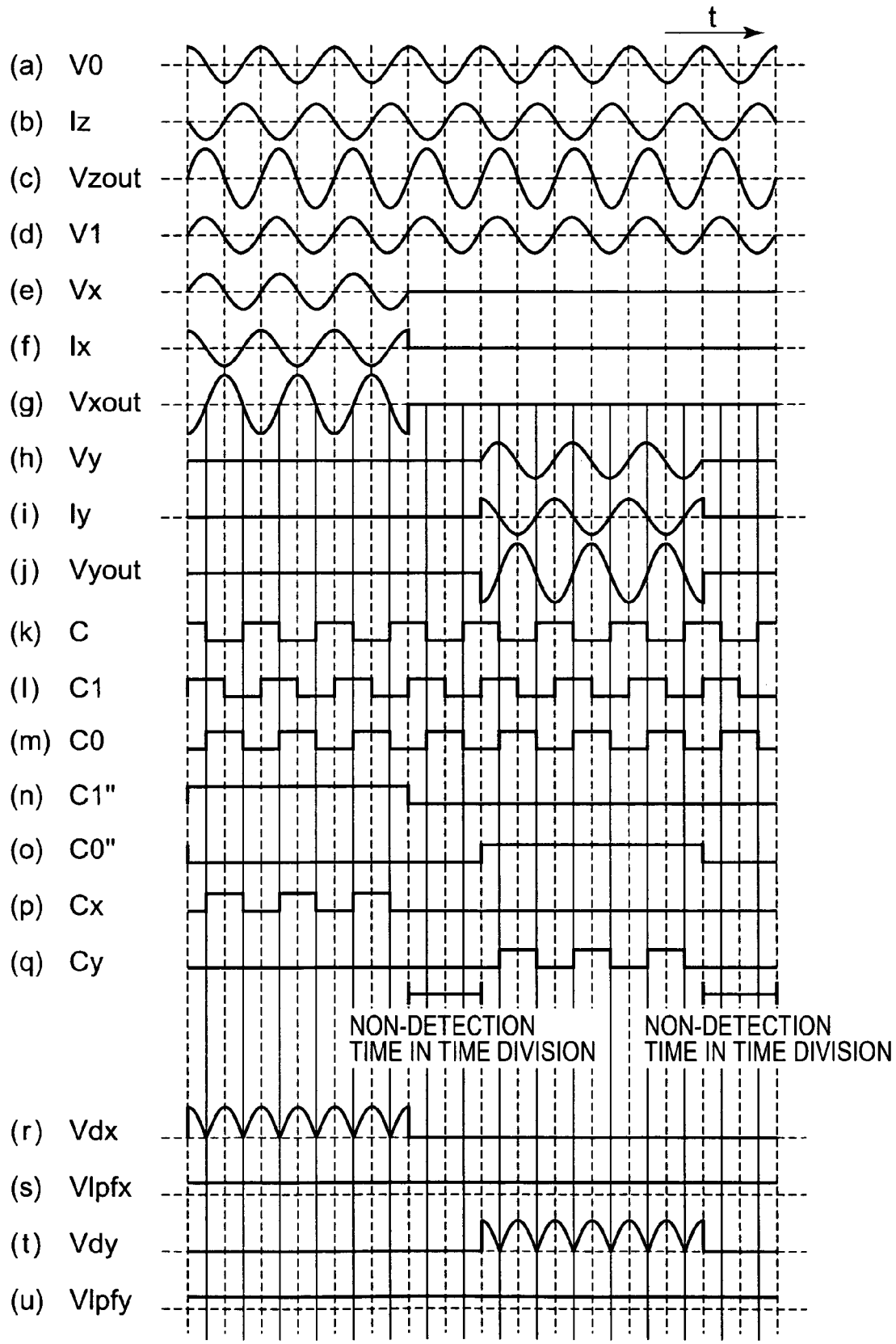
FIG. 7 is a timing chart showing signal waveforms in respective parts of the C/V conversion circuit of the first modification.

Further, FIG. 7 is a timing chart showing signal waveforms in respective portions of the C/V conversion circuit 100 of the first modification.

Here, parts (and signals) identical with the C/V conversion circuit 100 shown in FIG. 4 are given the same symbols and their detailed explanation is omitted. That is, in this modification, the parts different from the parts of the C/V conversion circuit 100 shown in FIG. 4 are explained.

In the first modification, in place of the pair of switching circuits 106 which is operated in synchronism with a clock signal C1' in the C/V conversion circuit 100 shown in FIG. 4, a switching circuit 124 which is operated in synchronism with a clock signal C1" and a switching circuit 125 which is operated in synchronism with a clock signal C0" are provided.

The switching circuit 124 performs switching of a circuit which applies the carrier wave to the x axis detection circuit 107 and a circuit which forcibly connects the x axis detection circuit 107 to a ground potential.

A state in which the switching circuit 124 is connected to the circuit in which the carrier wave is applied to the x axis detection circuit 107 is set as an ON state of the switching circuit 124, while a state in which the switching circuit 124 is connected to the circuit in which the x axis detection circuit 107 is connected to the ground potential is set as an OFF state.

In the same manner, the switching circuit 125 performs switching of a circuit which applies the carrier wave to the y axis detection circuit 108 and a circuit which forcibly connects the y axis detection circuit 108 to a ground potential.

A state in which the switching circuit 125 is connected to the circuit in which the carrier wave is applied to the y axis detection circuit 108 is set as an ON state of the switching circuit 125, while a state in which the switching circuit 125 is connected to the circuit in which the x axis detection circuit 108 is connected to the ground potential is set as an OFF state.

The C/V conversion circuit 100 shown in the first modification which is constituted in this manner includes, as shown in FIG. 7($n$) and FIG. 7($o$), a non-detection period (dead time) in time division during a period between a point of time that the clock signal C1" assumes an OFF state and a point of time that the clock signal C0" assumes an ON state.

The non-detection period in time division indicates a period from the point of time that switching circuit 124 assumes an OFF state and the point of time that the switching circuit 125 assumes an ON state in which both of the x axis detection circuit 107 and the y axis detection circuit 108 are connected to the ground potential.

Accordingly, during the non-detection period in time division, current signals (Ix, Iy) are not inputted to the current/voltage conversion circuit 110 from the x axis detection circuit 107 and the y axis detection circuit 108.

Since the detection of the Vxout signal and the Vyout signal is not performed during the non-detection period in time division, even when the signal waveform is rounded as shown in FIG. 10, the generation of crosstalk (interference with cross axis) can be suppressed.

In this manner, according to the C/V conversion circuit 100 shown in the first modification, by providing the non-detection time in time division in which the Vxout signal and the Vyout signal are not detected, the crosstalk (interference with cross axis) between two axes having angular velocity sensitivities can be further suppressed.

(Second Modification)

Next, the second modification of the above-mentioned angular velocity sensor is explained.

Figure 8:
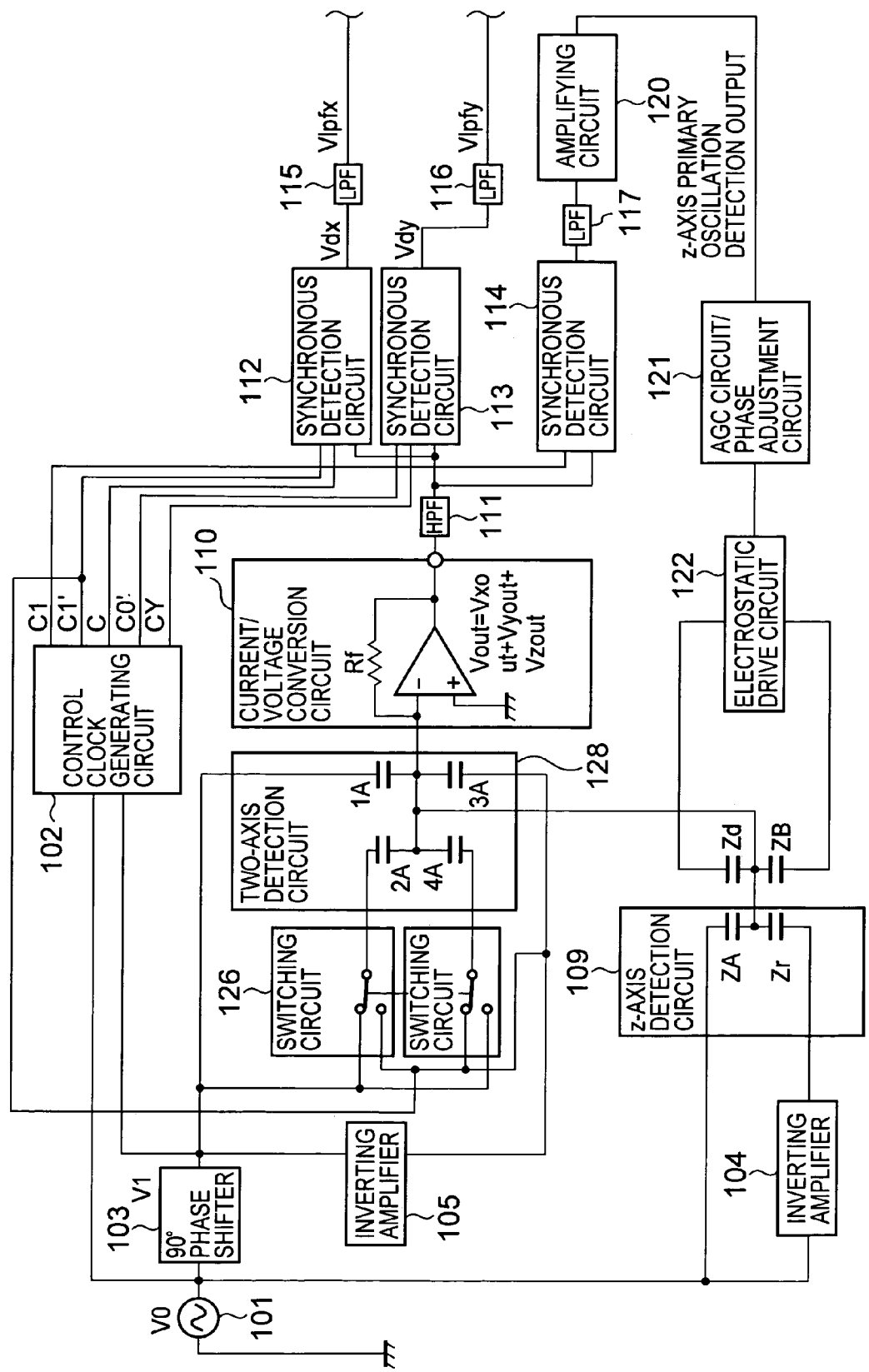
FIG. 8 is a circuit block diagram showing a C/V conversion circuit of a second modification.

FIG. 8 is a circuit block diagram showing a C/V conversion circuit 100 of the second modification.

Here, parts identical with the constitution of the parts of the above-mentioned angular velocity sensor are given the same symbols and their detailed explanation is omitted. That is, in this modification, the parts different from the parts of the above-mentioned angular velocity sensor are explained.

In the angular velocity sensor according to the above-mentioned embodiment, the x axis detection circuit 107 is formed using capacitors 1A to 4A and the y detection circuit 108 is formed using capacitors 1B to 4B. That is, the x axis detection circuit 107 and the y axis detection circuit 108 are formed using eight capacitors.

That is, the angular velocity sensor of the second modification is characterized by providing, in place of the x axis detection circuit 107 and the y axis detection circuit 108, a two-axis detection circuit 128 which is formed using the capacitors 1A to 4A which are constituted of fixed electrodes and a movable electrode (mass 13) which are mounted on an upper glass substrate 2.

The two-axis detection circuit 128 is a circuit which performs a function of the x axis detection circuit 107 as well as a function of the y axis detection circuit 108 of the above-mentioned acceleration sensor.

The two-axis detection circuit 128 is, as shown in FIG. 8, formed of capacitors 1A to 4A which have one ends thereof connected to the same point (an input point of the current/voltage conversion circuit 110).

The point to which the one ends of the capacitors 1A to 4A are preliminarily connected is referred to as a common point.

Here, using a pair of switching circuits 126 which is operated in synchronism with a clock signal C1', switching of connection points on another end sides of the capacitors 1A to 4A is performed.

The connection points on another ends of the capacitors 1A to 4A are referred to as variable ends.

The connection points of the switching circuit 126 are switched such that the switching circuit 126 assumes a connection state in which a detection circuit for detecting the displacement about the x axis is formed during a period in which the clock signal C1' assumes an ON state, while the switching circuit 126 assumes a connection state in which a detection circuit for detecting the displacement about the y axis is formed during a period in which the clock signal C1' assumes an OFF state.

To be more specific, during the period in which the clock signal C1 assumes an ON state, the variable ends of the capacitor 1A and the capacitor 4A are connected with each other, the variable ends of the capacitor 2A and the capacitor 3A are connected with each other, and the carrier wave is applied from the respective connection ends.

Then, from the common point of the two-axis detection circuit 128, a current signal indicative of a differential between electrostatic capacitances of the capacitors connected in series is inputted to the current/voltage conversion circuit 110 thus generating a Vxout signal which constitutes a detection signal of the angular velocity sensitivity of the x axis.

On the other hand, during the period in which the clock signal C1' assumes an OFF state, the variable ends of the capacitor 1A and the capacitor 2A are connected with each other, the variable ends of the capacitor 4A and the capacitor 3A are connected with each other, and a carrier wave is applied from the respective connection ends.

Then, from the common point of the two-axis detection circuit 128, a current signal indicative of a differential between electrostatic capacitances of the capacitors connected in series is inputted to the current/voltage conversion circuit 110 thus generating a Vyout signal which constitutes a detection signal of the angular velocity sensitivity of the y axis.

In this manner, in this second modification, four capacitors 1A to 4A are used in common for detecting the displacement in the x axis direction as well as for detecting the displacement in the y direction. Accordingly, it is possible to constitute an angular velocity sensor which possesses the substantially same detection sensitivity as the detection sensitivity of the angular velocity sensor which uses eight fixed electrodes shown in FIG. 4 by using the number of fixed electrodes half the number of the fixed electrodes used in angular velocity sensor shown in FIG. 4.

As has been described above, the second modification is directed to the sensor in which the displacement of the mass 13 in the x direction is detected by using all of fixed electrodes 21 to 24 arranged for detecting the change of the posture of the mass 13, that is, by using all of capacitors 1A to 4A, and, in the same manner, the displacement of the mass 13 in the y direction is detected by using all of capacitors 1A to 4A.

Here, by applying the method which method which effectively detects the change of the posture of the mass 13 using all of electrode sensitivities of the arranged fixed electrodes for detection to the angular velocity sensor which has eight capacitors 1A to 4A, 1B to 4B shown in FIG. 4, that is, by providing the constitution which detects the displacement of the mass 13 in the x axis direction (and also the displacement in the y axis direction) using all of eight capacitors 1A to 4A, 1B to 4B, it is possible to provide an angular velocity sensor which possesses the higher detection sensitivity (detection accuracy).

In this case, one ends of eight capacitors 1A to 4A, 1B to 4B are preliminarily connected to a same point (an input point of the current/voltage conversion circuit 110) and a connection state of the variable ends is switched using a pair of switching circuits 126 which is operated in synchronism with a clock signal C1'.

The connection points of the switching circuit 126 are switched such that the switching circuit 126 assumes a connection state in which a detection circuit for detecting the displacement about the x axis is formed during a period in which the clock signal C1' assumes an ON state, while the switching circuit 126 assumes a connection state in which a detection circuit for detecting the displacement about the y axis is formed during a period in which the clock signal C1' assumes an OFF state.

To be more specific, during a period in which the clock signal C1' assumes an ON state, the variable ends of the capacitor 1A, the capacitor 4A, the capacitor 2B and the capacitor 3B are connected with each other, the variable ends of the capacitor 2A, the capacitor 3A, the capacitor 1B and the capacitor 4B are connected with each other, and a carrier wave is applied from the respective connection ends.

Then, from the common point of the two-axis detection circuit 128, a current signal indicative of a differential between electrostatic capacitances of the capacitors connected in series is inputted to the current/voltage conversion circuit 110 thus generating the Vxout signal which constitutes a detection signal of the angular velocity sensitivity of the x axis.

On the other hand, during a period in which the clock signal C1' assumes an OFF state, the variable ends of the capacitor 1A, the capacitor 2A, the capacitor 3B and the capacitor 4B are connected with each other, the variable ends of the capacitor 4A, the capacitor 3A, the capacitor 1B and the capacitor 2B are connected, and a carrier wave is applied from the respective connection ends.

Then, from the common point of the two-axis detection circuit 128, a current signal indicative of a differential between electrostatic capacitances of the capacitors connected in series is inputted to the current/voltage conversion circuit 110 thus generating the Vyout signal which constitutes a detection signal of the angular velocity sensitivity of the y axis.

Here, when the posture of the mass 13 is changed as shown in FIG. 2C, a distance (a gap) between the fixed electrode and the movable electrode (the mass 13) which are mounted on the upper glass substrate 2 and a distance (a gap) between the fixed electrode and the movable electrode (mass 13) which are mounted on the lower glass substrate 3 are changed in an opposing manner.

Accordingly, during a period in which the displacement of the mass 13 in the x axis direction is detected, out of eight capacitors 1A to 4A, 1B to 4B, the capacitors which are formed on portions (positions) which are arranged in an opposed manner in the vertical direction of the mass 13 (z axis direction) with respect to the x axis (the first detection axis) as a boundary, that is, the capacitors which share the same changing direction (inclination of change) of electrostatic capacitances of the capacitors are connected with each other in series.

In this manner, by using eight capacitors 1A to 4A, 1B to 4B in common for detecting the displacement of the mass 13 in the x axis direction as well as for the displacement of the mass 13 in the y axis direction, it is possible to provide the angular velocity sensor having the detection sensitivity (detection accuracy) higher than (twice as high as) the detection sensitivity of the angular velocity sensor which uses eight fixed electrodes shown in FIG. 4.

(Third Modification)

Next, a third modification of the above-mentioned angular velocity sensor is explained.

The third modification is characterized by a C/V conversion circuit 100 which performs processing which provides a non-detection time in which a Vzout signal which is separated by phase division processing is not detected for suppressing the generation of crosstalk (the interference with cross axis) between detection signals of the x axis and the y axis, that is, the detection signals of the angular velocities and the detection signal of the z axis.

As described above, in the above-mentioned time division processing of the angular velocity components shown in FIG. 5 and FIG. 7, the Vxout signal and the Vyout signal are alternately outputted.

However, when a response possible region of a current/voltage conversion circuit 110 is insufficient, for example, when a limit of a high frequency band is low, at timing of switching the signal during time division processing, the Vxout signal and the Vyout signal are rounded.

Figure 11:
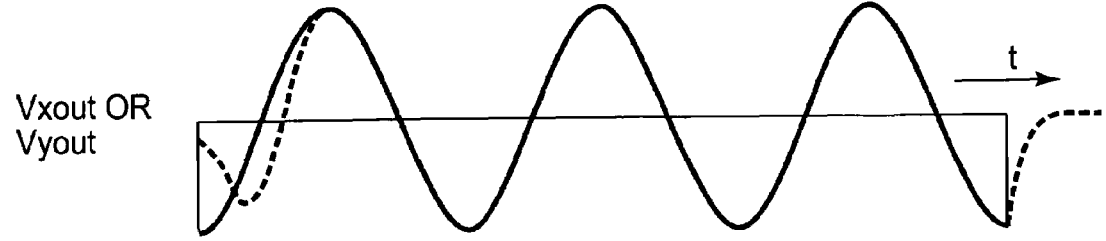
FIG. 11 is a view showing rounding of signal waveforms.

To be more specific, when the signal is turned on or off, that is, when the Vxout signal or the Vyout signal rises or falls, a delay (a phase delay) is generated as shown in FIG. 11 by a dotted line.

Here, such a transitional rounding of a signal waveform, that is, a transitional phase delay remarkably appears when the switching between the x axis detection circuit 107 and the y axis detection circuit 108 is performed at timing in which a phase of synchronous detection wave clock (feeding wave) assumes 90° or 270°.

Figure 12:
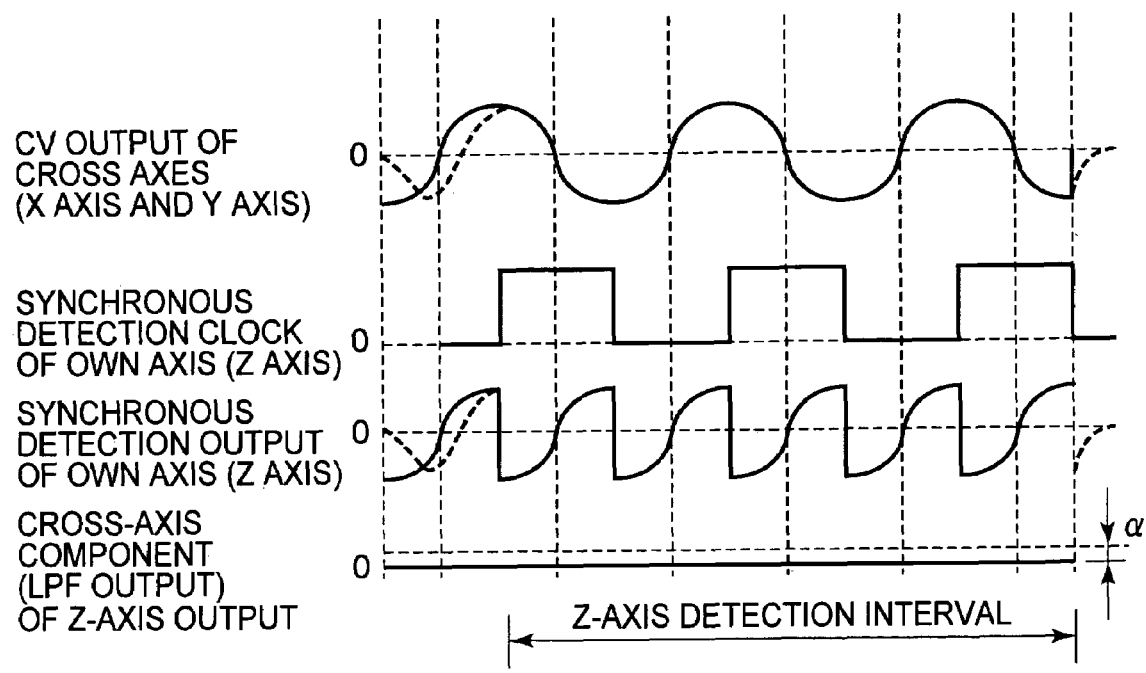
FIG. 12 is a view for explaining a crosstalk to a z axis detection signal.

As shown in FIG. 12, when a phase delay of the Vxout signal or the Vyout signal, that is, phase delays of CV outputs of cross axes (x axis and y axis) exist, a phase delay of a synchronous detection output of an own axis (here, the z axis) is indicated by a dotted line.

Accordingly, as shown in FIG. 12, as a component corresponding to the delay of the phase (indicated by a), a crosstalk is generated in the detection signal of the z axis.

In the angular velocity sensor according to this embodiment, based on the detection signal (the z axis signal) of the z axis detection circuit 109, a drive signal which allows the mass 13 to perform the resonance primary oscillation for detecting the Coriolis force is generated. Further, the detection signal (the z axis signal) of the z axis detection circuit is used as a reference signal of a synchronous detection circuit 114.

Accordingly, when the waveform rounding of the Vxout signal and the Vyout signal described above generates the crosstalk to the detection signal of the z axis detection circuit 109, the crosstalk directly leads to noises (noise signals) and hence, the oscillation accuracy and stability of the mass 13 and, further, the detection accuracy of the synchronous detection circuit 114 are deteriorated thus lowering the detection accuracy of the angular velocity sensor.

Accordingly, to prevent the crosstalk to the z-axis detection signal (z-axis output) from being influenced by the crosstalk, the non-detection time (non-detection interval) of the z axis detection signal is provided during a period in which an interference from cross axis (x axis, y axis) is expected, that is, during a period in which the generation of the crosstalk is expected.

Figure 13:
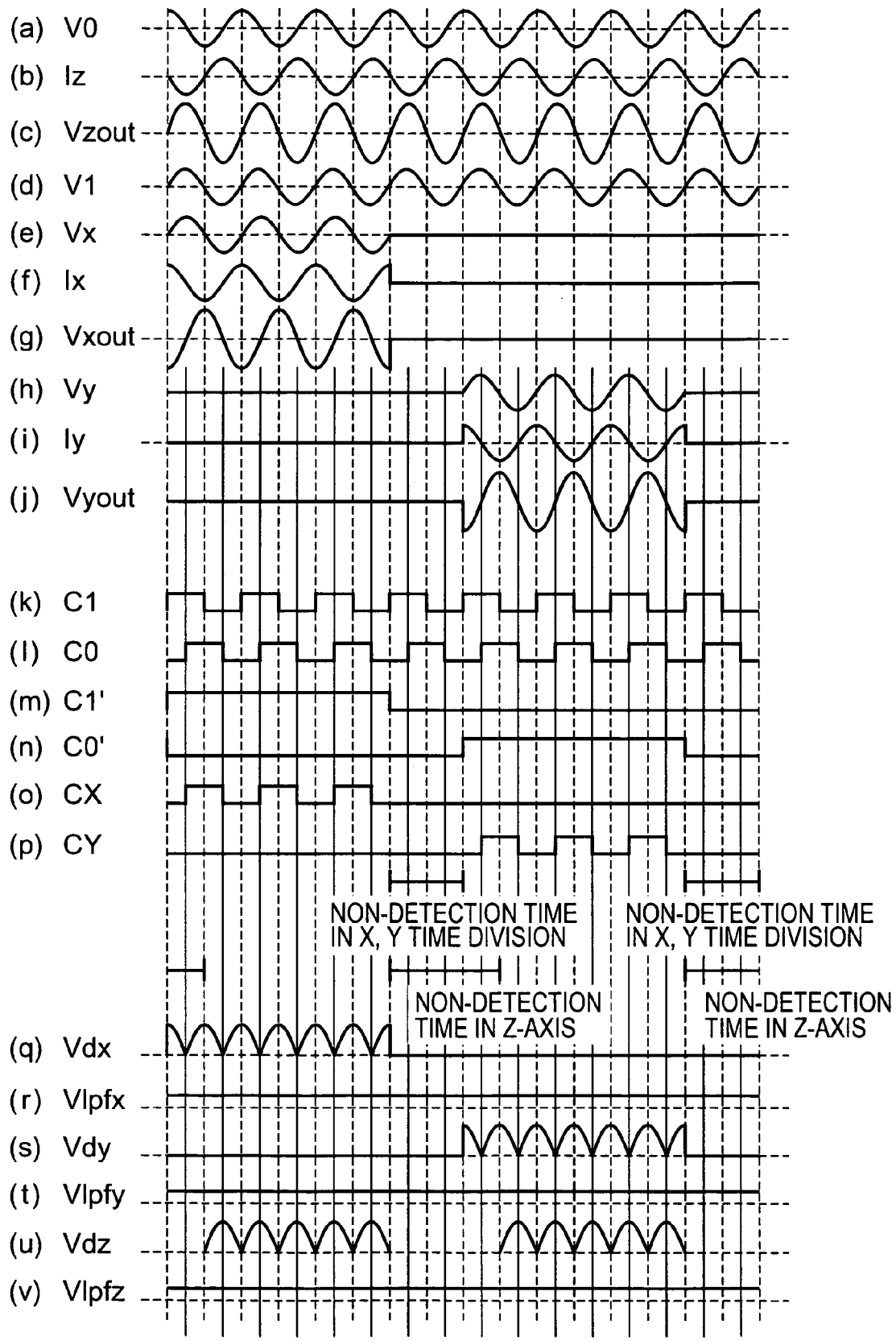
FIG. 13 is a timing chart showing signal waveforms in respective parts of a C/V conversion circuit of a third modification.

FIG. 13 is a timing chart showing signal waveforms in respective parts in the C/V conversion circuit 100 of the third modification.

In the timing chart shown in FIG. 13, as described in the above-mentioned first modification, the explanation is made with respect to a case in which a non-detection time in which a Vxout signal and a Vyout signal are not detected is provided in time division as an example.

The non-detection time of the z-axis detection signal is set, for example, as shown in FIG. 13, corresponding to the switching timings of time division in the x axis detection and the y axis detection.

To be more specific, the non-detection time of the z-axis detection signal is set as a time extending over from a period in which the waveform of one signal to be subjected to the time division at the time of rising becomes rounded (the phase of the signal being delayed) to a period in which the waveform of another signal to be subjected to the time division at the time of rising becomes rounded (the phase of the signal being delayed).

To be more specific, in the modification shown in the timing chart of FIG. 13, the time from a point of time of starting the non-detection time in the time division in which the Vxout signal and the Vyout signal are not detected to a point of time after a lapse of half cycle (½ cycle) counted from the finishing of the non-detection time in the time division is set as the non-detection time of the z-axis detection signal.

By setting the non-detection time of the z-axis detection signal in this manner, the detection period (detection interval) of the z-axis (Vzout signal) is started with the delay from the starting of detection of the x-axis signal (Vxout signal) or the y-axis signal (Vyout signal). Further, simultaneously or earlier than the finishing of the detection of the x-axis signal (Vxout signal) or the y-axis signal (Vyout signal), the detection period (detection interval) of the z-axis signal (Vzout signal) is finished.

Here, the respective detection signals of the x-axis signal (Vxout signal), the y-axis signal (Vyout signal) and the z-axis signal (Vzout signal), that is, the output signals of the synchronous detection circuits 112, 113, 114 are indicated as x-axis detection signal (Vdx), the y-axis detection signal (Vdy) and the z-axis detection signal (Vdz).

Here, setting of the finishing times of the non-detection time of the z-axis signal is explained.

When the non-detection time of the z-axis detection signal is prolonged, the detection time of the z-axis detection signal is shortened and the sensitivity of the z-axis is lowered. Accordingly, an. S/N ratio (a signal vs noise ratio) of the detected z-axis detection signal is deteriorated thus giving rise to a possibility that the detection accuracy is lowered.

Accordingly, it is desirable that the non-detection time of the z-axis detection signal is set to a necessary minimum length.

As described above, the rounding of waveforms of the Vxout signal and the Vyout signal which are outputted from the current/voltage conversion circuit 110 is generated due to the limitation of a high frequency-side band in the current/voltage conversion circuit 110.

Here, assume the relationship between a high-frequency-side cutoff frequency fc of the current/voltage conversion circuit 110 and the frequency fo of the carrier wave (the V0 signal) as follows.

$$fc = kfo \quad (1)$$

Here, k is a proportional constant and is usually 1 or more.

In the formula (1), the larger the proportional constant k, the degree of rounding of the waveform becomes relatively small.

For example, assuming that the frequency characteristic in the high frequency band of the current/voltage conversion circuit 110 has linear attenuation characteristic, the high-frequency-side cutoff frequency fc can be expressed as follows.

$$fc = 1/2\pi\tau \quad (2)$$

Here, τ indicates a time constant.

Figure 14:
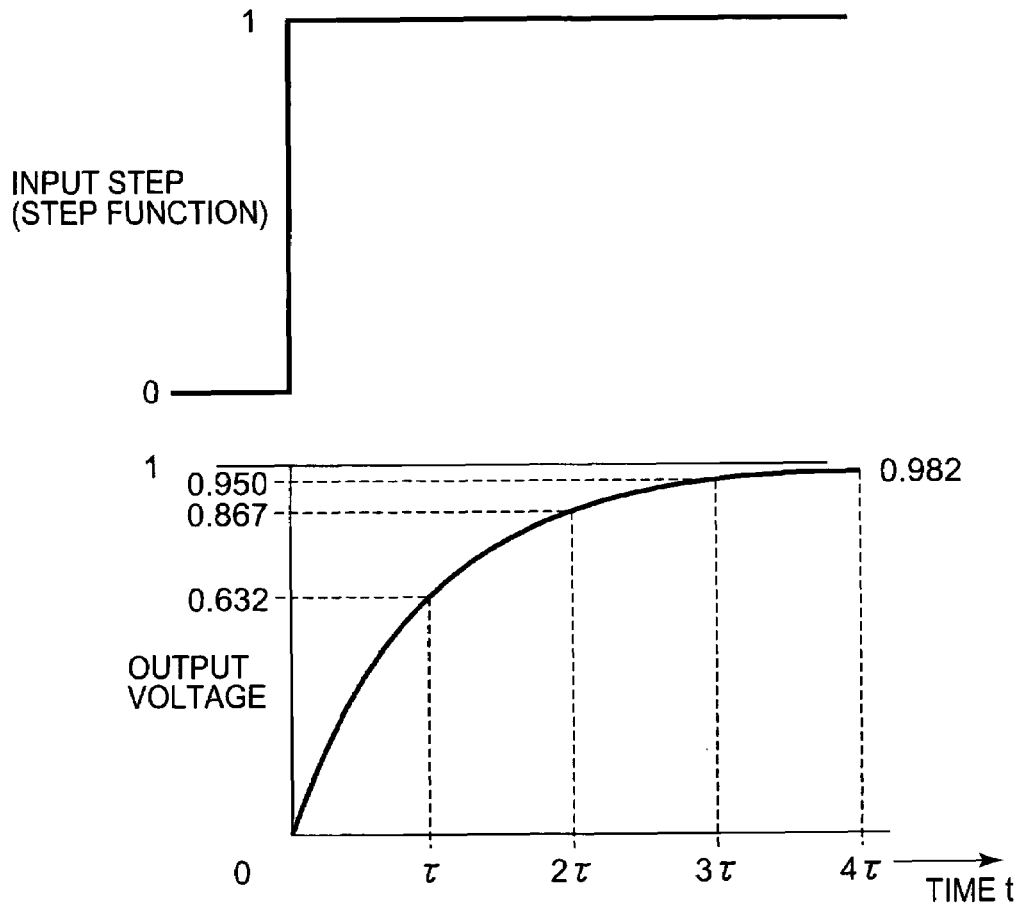
FIG. 14 is a view showing step response characteristics in a current/voltage conversion circuit.

FIG. 14 is a view showing step response characteristics in the current/voltage conversion circuit 110.

Here, in FIG. 14, an upper stage shows an input voltage (a step function) and a lower stage shows an output voltage (a response waveform).

As shown in FIG. 14, it is understood that at a point of time that a time of 3τ elapses after supplying the input voltage, the output voltage rises to approximately 95% of the input voltage and, at a point of time that a time of 4τ elapses after supplying the input voltage, the output voltage rises to approximately 98% of the input voltage.

That is, the time (period) from t=0 (the supply of the input voltage) to t=4τ becomes the period in which the rounding of waveform is generated.

Figure 15:
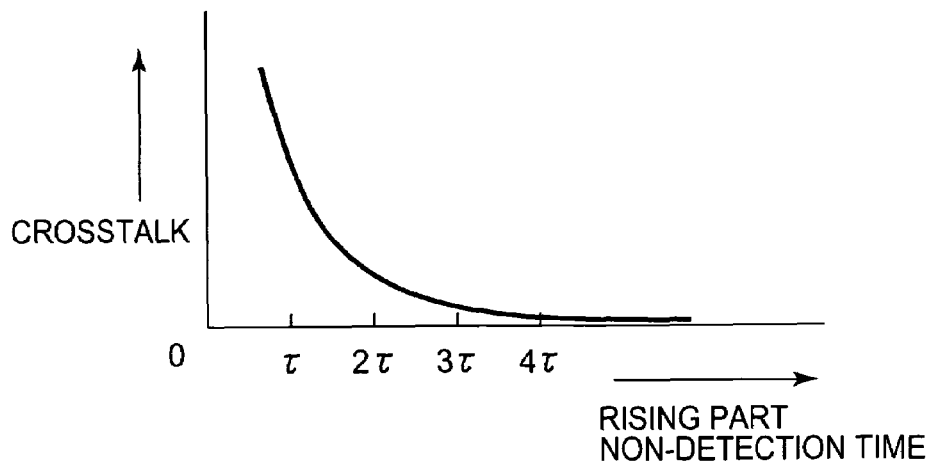
FIG. 15 is a view showing the relationship between a time from a point of time that the detection of an x-axis signal or a y-axis signal is started to a point of time that a non-detection time of a z-axis detection signal is finished and cross talk to the z-axis detection signal.

FIG. 15 is a view showing the relationship between a time from a point of time that the detection of the x-axis signal (Vxout signal) or the y-axis signal (Vyout signal) is started to a point of time that a non-detection time of the z-axis detection signal is finished and a crosstalk to the z-axis detection signal.

Here, the crosstalk taken on an axis of ordinate indicates an interference quantity from cross axis (the x axis, the y axis) contained in the z-axis detection signal.

Based on the relationship graph shown in FIG. 15, the finishing time of the non-detection time of the z-axis detection signal is set within a range which satisfies the specification (an allowable range of accuracy) of the sensor.

For example, by setting the finishing time of the non-detection time of the z-axis detection signal to a point of time after a lapse of 3τ to 4τ from a point of time that the detection of the x-axis signal (Vxout signal) or the y-axis signal (Vyout signal) is started, it is possible to largely improve the reduction of the crosstalk to the z-axis detection signal.

Here, the time constant T is expressed as follows based on the above-mentioned formula (1) and the formula (2).

$$\tau = 1/2\pi fc = 1/2\pi kfo = To/2\pi k \quad (3)$$

Here, To indicates a cycle of the carrier wave (V0 signal) Then, 2τ, 3τ, 4τ can be respectively expressed using T0 and k.

$$2\tau = 2/2\pi kfo = 2To/2\pi k \quad (4)$$

$$3\tau = 3/2\pi kfo = 3To/2\pi k \quad (5)$$

$$4\tau = 4/2\pi kfo = 4To/2\pi k \quad (6)$$

As can be understood from the above formula (3) to formula (6), the larger a value of k, the non-detection time of the z-axis detection signal is shortened.

In this manner, according to the C/V conversion circuit 100 shown in the third modification, by providing the non-detection time of the z-axis detection signal, it is possible to suppress (reduce) the influence of the crosstalk to the z-axis detection signal from the x-axis detection signal and the y-axis detection signal. Accordingly, the noise quantity attributed to the electrostatic drive signal of the mass 13 can be reduced and hence, the detection accuracy of the angular velocity can be enhanced.

(Fourth Modification)

Next, the explanation is made with respect to the fourth modification which shows another example which provides a non-detection time to suppress the generation of crosstalk.

FIG. 16 is a timing chart showing signal waveforms in respective parts of the C/V conversion circuit 100 of the fourth modification.

Carrier waves which are applied to an X-axis detection circuit 107 and a y-axis detection circuit 108 are applied by alternately switching a circuit branch point in a switching circuit 106 based on timing (clock signal C1') that a specific control clock generated by a control clock generation circuit is inputted.

Further, in extracting (separating) an x-axis detection signal (Vdx) and a y-axis detection signal (Vdy) from an output signal of a current/voltage conversion circuit 110, there is provided a non-detection time in time division in which the signal is not detected (extracted) for a fixed time from a point of time at which the carrier waves applied to the x-axis detection circuit 107 and the y-axis detection circuit 108 are switched.

In the same manner, in detecting a z-axis detection signal (Vdz), there is provided a non-detection time in which the z-axis signal is not detected for a fixed time from a point of time at which the carrier waves applied to the x-axis detection circuit 107 and the y-axis detection circuit 108 are switched.

That is, a ½ cycle from a point of time that the application of the carrier wave to the x-axis detection circuit 107 or the y-axis detection circuit 108 is started is set as the non-detection time in which the z-axis signal is not detected.

Further, a ½ cycle from a point of time that the application of the carrier wave to the x-axis detection circuit 107 or the y-axis detection circuit 108 is finished is set as the non-detection time in which a z-axis signal is not detected.

Accordingly, as shown in FIG. 16, when the application time in which the carrier wave is applied to the x-axis detection circuit 107 and the application time in which the carrier wave is applied to the y-axis detection circuit 108 are switched continuously, the non-detection time in which the z-axis signal is not detected after starting the application of the carrier waves is overlapped to such a non-detection time after finishing the application of the carrier waves.

Accordingly, the ½ cycle is sufficient as the non-detection time in which the z-axis signal is not detected and hence, the non-detection time can be shortened, whereby the sensitivity of the angular velocity sensor can be enhanced.

Further, in extracting (separating) the x-axis detection signal (Vdx) and the y-axis detection signal (Vdy) from an output signal of the current/voltage conversion circuit 110, there is provided a non-detection time in time division in which the signal is not detected (extracted) for a fixed time from a point of time at which the carrier waves applied to the x-axis detection circuit 107 and the y-axis detection circuit 108 are switched.

The non-detection time in which the z-axis signal is not detected and the non-detection time in the time division share the same starting time and hence, by setting the finishing time of both non-detection times, that is, lengths of both non-detection times equal (for example, 1 cycle) to each other, a circuit for generating signal for setting the non-detection time (non-detection period) can be used in common whereby the sensor circuit can be simplified.

Further, by providing the non-detection time in which the z-axis detection signal is not detected and the non-detection time in the time division, it is possible to properly obviate the detection of signal in the interval having the rounding of the waveform (distortion of waveform) Accordingly, it is possible to suppress the deterioration of the sensitivity due to the influence of the crosstalk (the interference of cross axis).

Here, the technique which provides the non-detection time for reducing the influence of the crosstalk described in the first, the third and the fourth modifications may be applicable to a sensor which functions as the capacitor for detecting the displacement in the x-axis direction and the capacitor for detecting the displacement in the y-axis direction described in the second modification.

What is claimed is:

1. An angular velocity sensor comprising: a frame having a hollow portion;
   a mass which is supported on the frame by way of resilient beams which are formed in an x-axis direction and a y-axis direction orthogonal to each other, has a thickness in a z-axis direction orthogonal to the x axis and the y axis respectively, wherein a surface portion of the mass functions as a movable electrode and changes a posture thereof corresponding to an external force;
   a plurality of fixed electrodes which are arranged to face the mass in an opposed manner;
   a first detection circuit which detects a change of electrostatic capacitance between the fixed electrodes and the movable electrode along with an inclination of the mass in the y-axis direction;
   a second detection circuit which detects a change of electrostatic capacitance between the fixed electrodes and the movable electrode along with an inclination of the mass in the x-axis direction;
   a third detection circuit which detects a change of electrostatic capacitance between the fixed electrodes and the movable electrode along with a displacement of the mass in the z-axis direction;
   a phase shifting means which shifts a phase of a carrier wave which is applied to the third detection circuit by 90° from a phase of a carrier wave which is applied to the first detection circuit and the second detection circuit;
   a switching means which alternately performs the application of carrier wave to the first detection circuit and the second detection circuit based on timing of a control clock signal by switching the application for every fixed cycle;
   an amplifying circuit to which output signals from the first detection circuit, the second detection circuit and the third detection circuit are inputted;
   a first separation means which separates an angular velocity component signal which is constituted of a first detection signal indicative of the change of the electrostatic capacitance in the first detection circuit and a second detection signal indicative of the change of the electrostatic capacitance in the second detection circuit and a third detection signal indicative of the change of the electrostatic capacitance in the third detection circuit from each other by performing phase division processing based on the timing of the control clock signal in response to the output signals from the amplifying circuit;
   a second separation means which separates the first detection signal and the second detection signal from each other by performing a time division processing based on switching timing of the carrier wave by the switching means in response to the angular velocity component signal;
   an angular velocity output means which outputs an angular velocity acting about the x axis of the mass in response to the first detection signal and outputs an angular velocity acting about the y axis direction of the mass in response to the second detection signal; and
   a driving means which oscillates the mass in the z-axis direction while performing a position control in response to the third detection signal.

2. An angular velocity sensor according to claim 1, wherein
   the first detection circuit includes a circuit which is formed by connecting two electrostatic capacitance elements in series which change electrostatic capacitances symmetrically along with the inclination of the mass in the y-axis direction out of electrostatic capacitance elements which are constituted of the fixed electrodes and the movable electrode;
   the second detection circuit includes a circuit which is formed by connecting two electrostatic capacitance elements in series which change electrostatic capacitances symmetrically along with the inclination of the mass in the x-axis direction out of electrostatic capacitance elements which are constituted of the fixed electrodes and the movable electrode;
   the third detection circuit includes a circuit which is formed by connecting an electrostatic capacitance element which changes electrostatic capacitance along with the displacement of the mass in the z-axis direction and a specific electrostatic capacitance elements in series out of electrostatic capacitance elements which are constituted of the fixed electrodes and the movable electrode; and
   the angular velocity sensor further includes a carrier wave applying means which applies carrier waves whose phases are inverted from each other by 1800 to the respective electrostatic capacitance elements which are connected in series in the first detection circuit, the second detection circuit and the third detection circuit.

3. An angular velocity sensor according to claim 1, wherein the second separation means, after a lapse of a predetermined time from the timing of switching of the carrier wave by the switching means, separates the first detection signal or the second detection signal.

4. An angular velocity sensor according to claim 2, wherein the second separation means, after a lapse of a predetermined time from the timing of switching of the carrier wave by the switching means, separates the first detection signal or the second detection signal.

5. An angular velocity sensor according to claim 1, wherein the fixed electrodes include four first electrodes which, using a center position of mass as a reference position, are arranged equidistantly around the reference position on the same plane,
   the first detection circuit includes a circuit in which a circuit which is formed by connecting an electrostatic capacitance element which is constituted of the first electrode positioned in a first quadrant on an x-y plane out of four first electrodes and the movable electrode and an electrostatic capacitance element which is constituted of a first electrode positioned in a second quadrant on the x-y plane out of four first electrodes and the movable electrode in parallel, and a circuit which is formed by connecting an electrostatic capacitance element which is constituted of the first electrode positioned in a fourth quadrant on an x-y plane out of four first electrodes and the movable electrode and an electrostatic capacitance element which is constituted of a first electrode positioned in a third quadrant on the x-y plane out of four first electrodes and the movable electrode in parallel are connected in series, and the second detection circuit includes a circuit in which a circuit which is formed by connecting the electrostatic capacitance element which is constituted of the first electrode positioned in the first quadrant on an x-y plane out of four first electrodes and the movable electrode and the electrostatic capacitance element which is constituted of the first electrode positioned in the fourth quadrant on the x-y plane out of four first electrodes and the movable electrode in parallel, and a circuit which is formed by connecting the electrostatic capacitance element which is constituted of the first electrode positioned in the third quadrant on the x-y plane out of four first electrodes and the movable electrode and the electrostatic capacitance element which is constituted of the first electrode positioned in the second quadrant on the x-y plane out of four first electrodes and the movable electrode in parallel are connected in series, and the switching means switches wirings of the first detection circuit and the second detection circuit.

6. An angular velocity sensor according to claim 2, wherein the fixed electrodes include four first electrodes which, using a center position of mass as a reference position, are arranged equidistantly around the reference position on the same plane, the first detection circuit includes a circuit in which a circuit which is formed by connecting an electrostatic capacitance element which is constituted of the first electrode positioned in a first quadrant on an x-y plane out of four first electrodes and the movable electrode and an electrostatic capacitance element which is constituted of a first electrode positioned in a second quadrant on the x-y plane out of four first electrodes and the movable electrode in parallel, and a circuit which is formed by connecting an electrostatic capacitance element which is constituted of the first electrode positioned in a fourth quadrant on an x-y plane out of four first electrodes and the movable electrode and an electrostatic capacitance element which is constituted of a first electrode positioned in a third quadrant on the x-y plane out of four first electrodes and the movable electrode in parallel are connected in series, and the second detection circuit includes a circuit in which a circuit which is formed by connecting the electrostatic capacitance element which is constituted of the first electrode positioned in the first quadrant on an x-y plane out of four first electrodes and the movable electrode and the electrostatic capacitance element which is constituted of the first electrode positioned in the fourth quadrant on the x-y plane out of four first electrodes and the movable electrode in parallel, and a circuit which is formed by connecting the electrostatic capacitance element which is constituted of the first electrode positioned in the third quadrant on the x-y plane out of four first electrodes and the movable electrode and the electrostatic capacitance element which is constituted of the first electrode positioned in the second quadrant on the x-y plane out of four first electrodes and the movable electrode in parallel are connected in series, and the switching means switches wirings of the first detection circuit and the second detection circuit.

7. An angular velocity sensor according to claim 3, wherein the fixed electrodes include four first electrodes which, using a center position of mass as a reference position, are arranged equidistantly around the reference position on the same plane, the first detection circuit includes a circuit in which a circuit which is formed by connecting an electrostatic capacitance element which is constituted of the first electrode positioned in a first quadrant on an x-y plane out of four first electrodes and the movable electrode and an electrostatic capacitance element which is constituted of a first electrode positioned in a second quadrant on the x-y plane out of four first electrodes and the movable electrode in parallel, and a circuit which is formed by connecting an electrostatic capacitance element which is constituted of the first electrode positioned in a fourth quadrant on an x-y plane out of four first electrodes and the movable electrode and an electrostatic capacitance element which is constituted of a first electrode positioned in a third quadrant on the x-y plane out of four first electrodes and the movable electrode in parallel are connected in series, and the second detection circuit includes a circuit in which a circuit which is formed by connecting the electrostatic capacitance element which is constituted of the first electrode positioned in the first quadrant on an x-y plane out of four first electrodes and the movable electrode and the electrostatic capacitance element which is constituted of the first electrode positioned in the fourth quadrant on the x-y plane out of four first electrodes and the movable electrode in parallel, and a circuit which is formed by connecting the electrostatic capacitance element which is constituted of the first electrode positioned in the third quadrant on the x-y plane out of four first electrodes and the movable electrode and the electrostatic capacitance element which is constituted of the first electrode positioned in the second quadrant on the x-y plane out of four first electrodes and the movable electrode in parallel are connected in series, and the switching means switches wirings of the first detection circuit and the second detection circuit.

8. An angular velocity sensor according to claim 4, wherein the fixed electrodes include four first electrodes which, using a center position of mass as a reference position, are arranged equidistantly around the reference position on the same plane, the first detection circuit includes a circuit in which a circuit which is formed by connecting an electrostatic capacitance element which is constituted of the first electrode positioned in a first quadrant on an x-y plane out of four first electrodes and the movable electrode and an electrostatic capacitance element which is constituted of a first electrode positioned in a second quadrant on the x-y plane out of four first electrodes and the movable electrode in parallel, and a circuit which is formed by connecting an electrostatic capacitance element which is constituted of the first electrode positioned in a fourth quadrant on an x-y plane out of four first electrodes and the movable electrode and an electrostatic capacitance element which is constituted of a first electrode positioned in a third quadrant on the x-y plane out of four first electrodes and the movable electrode in parallel are connected in series, and the second detection circuit includes a circuit in which a circuit which is formed by connecting the electrostatic capacitance element which is constituted of the first electrode positioned in the first quadrant on an x-y plane out of four first electrodes and the movable electrode and the electrostatic capacitance element which is constituted of the first electrode positioned in the fourth quadrant on the x-y plane out of four first electrodes and the movable electrode in parallel, and a circuit which is formed by connecting the electrostatic capacitance element which is constituted of the first electrode positioned in the third quadrant on the x-y plane out of four first electrodes and the movable electrode and the electrostatic capacitance element which is constituted of the first electrode positioned in the second quadrant on the x-y plane out of four first electrodes and the movable electrode in parallel are connected in series, and the switching means switches wirings of the first detection circuit and the second detection circuit.

9. An angular velocity sensor according to claim 5, wherein the fixed electrodes further include four second electrodes on a plane which face the four first electrodes in an opposed manner by way of the mass, the first detection circuit includes a circuit which connects an electrostatic capacitance element which is constituted of the second electrode positioned in the fourth quadrant on an x-y plane out of four second electrodes and the movable electrode and an electrostatic capacitance element which is constituted of the second electrode positioned in the third quadrant on the x-y plane out of four second electrodes and the movable electrode with an electrostatic capacitance element which is constituted of the first electrode positioned in the first quadrant on the x-y plane out of four first electrodes and the movable electrode in parallel, and connects an electrostatic capacitance element which is constituted of the second electrode positioned in the first quadrant on an x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the third quadrant on the x-y plane out of four first electrodes and the movable electrode in parallel, the second detection circuit includes a circuit which connects an electrostatic capacitance element which is constituted of the second electrode positioned in the first quadrant on the x-y plane out of four second electrodes and the movable electrode and an electrostatic capacitance element which is constituted of the second electrode positioned in the fourth quadrant on the x-y plane out of four second electrodes and the movable electrode with an electrostatic capacitance element which is constituted of the first electrode positioned in the third quadrant on the x-y plane out of four first electrodes and the movable electrode in parallel, and connects an electrostatic capacitance element which is constituted of the second electrode positioned in the third quadrant on the x-y plane out of four second electrodes and the movable electrode, and an electrostatic capacitance element which is constituted of the second electrode positioned in the second quadrant on the x-y plane out of four second electrodes and the movable electrode with an electrostatic capacitance element which is constituted of the first electrode positioned in the first quadrant on the x-y plane out of four first electrodes and the movable electrode in parallel.

10. An angular velocity sensor according to claim 6, wherein the fixed electrodes further include four second electrodes on a plane which face the four first electrodes in an opposed manner by way of the mass, the first detection circuit includes a circuit which connects an electrostatic capacitance element which is constituted of the second electrode positioned in the fourth quadrant on an x-y plane out of four second electrodes and the movable electrode and an electrostatic capacitance element which is constituted of the second electrode positioned in the third quadrant on the x-y plane out of four second electrodes and the movable electrode with an electrostatic capacitance element which is constituted of the first electrode positioned in the first quadrant on the x-y plane out of four first electrodes and the movable electrode in parallel, and connects an electrostatic capacitance element which is constituted of the second electrode positioned in the first quadrant on an x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the third quadrant on the x-y plane out of four first electrodes and the movable electrode in parallel, the second detection circuit includes a circuit which connects an electrostatic capacitance element which is constituted of the second electrode positioned in the first quadrant on the x-y plane out of four second electrodes and the movable electrode and an electrostatic capacitance element which is constituted of the second electrode positioned in the fourth quadrant on the x-y plane out of four second electrodes and the movable electrode with an electrostatic capacitance element which is constituted of the first electrode positioned in the third quadrant on the x-y plane out of four first electrodes and the movable electrode in parallel, and connects an electrostatic capacitance element which is constituted of the second electrode positioned in the third quadrant on the x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the first quadrant on the x-y plane out of four first electrodes and the movable electrode in parallel.

11. An angular velocity sensor according to claim 7, wherein the fixed electrodes further include four second electrodes on a plane which face the four first electrodes in an opposed manner by way of the mass, the first detection circuit includes a circuit which connects an electrostatic capacitance element which is constituted of the second electrode positioned in the fourth quadrant on an x-y plane out of four second electrodes and the movable electrode and an electrostatic capacitance element which is constituted of the second electrode positioned in the third quadrant on the x-y plane out of four second electrodes and the movable electrode with an electrostatic capacitance element which is constituted of the first electrode positioned in the first quadrant on the x-y plane out of four first electrodes and the movable electrode in parallel, and connects an electrostatic capacitance element which is constituted of the second electrode positioned in the first quadrant on an x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the third quadrant on the x-y plane out of four first electrodes and the movable electrode in parallel, the second detection circuit includes a circuit which connects an electrostatic capacitance element which is constituted of the second electrode positioned in the first quadrant on the x-y plane out of four second electrodes and the movable electrode and an electrostatic capacitance element which is constituted of the second electrode positioned in the fourth quadrant on the x-y plane out of four second electrodes and the movable electrode with an electrostatic capacitance element which is constituted of the first electrode positioned in the third quadrant on the x-y plane out of four first electrodes and the movable electrode in parallel, and connects an electrostatic capacitance element which is constituted of the second electrode positioned in the third quadrant on the x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the first quadrant on the x-y plane out of four first electrodes and the movable electrode in parallel.

12. An angular velocity sensor according to claim 8, wherein the fixed electrodes further include four second electrodes on a plane which face the four first electrodes in an opposed manner by way of the mass, the first detection circuit includes a circuit which connects an electrostatic capacitance element which is constituted of the second electrode positioned in the fourth quadrant on an x-y plane out of four first electrodes and the movable electrode and an electrostatic capacitance element which is constituted of the second electrode positioned in the third quadrant on the x-y plane out of four second electrodes and the movable electrode with an electrostatic capacitance element which is constituted of the first electrode positioned in the first quadrant on the x-y plane out of four second electrodes and the movable electrode in parallel, and connects an electrostatic capacitance element which is constituted of the second electrode positioned in the first quadrant on an x-y plane out of four second electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the third quadrant on the x-y plane out of four first electrodes and the movable electrode in parallel, the second detection circuit includes a circuit which connects an electrostatic capacitance element which is constituted of the second electrode positioned in the first quadrant on the x-y plane out of four second electrodes and the movable electrode and an electrostatic capacitance element which is constituted of the second electrode positioned in the fourth quadrant on the x-y plane out of four second electrodes and the movable electrode with an electrostatic capacitance element which is constituted of the first electrode positioned in the third quadrant on the x-y plane out of four second electrodes and the movable electrode in parallel, and connects an electrostatic capacitance element which is constituted of the second electrode positioned in the third quadrant on the x-y plane out of four first electrodes and the movable electrode and an electrostatic capacitance element which is constituted of the second electrode positioned in the second quadrant on the x-y plane out of four second electrodes and the movable electrode with an electrostatic capacitance element which is constituted of the first electrode positioned in the first quadrant on the x-y plane out of four first electrodes and the movable electrode in parallel.

13. An angular velocity sensor according to claim 1, wherein the first separation means, after a lapse of a predetermined time from the timing at which the carrier waves are switched by the switching means, separates the third detection signal.

14. An angular velocity sensor according to claim 2, wherein the first separation means, after a lapse of a predetermined time from the timing at which the carrier waves are switched by the switching means, separates the third detection signal.

15. An angular velocity sensor according to claim 3, wherein the first separation means, after a lapse of a predetermined time from the timing at which the carrier waves are switched by the switching means, separates the third detection signal.

16. An angular velocity sensor according to claim 4, wherein the first separation means, after a lapse of a predetermined time from the timing at which the carrier waves are switched by the switching means, separates the third detection signal.

17. An angular velocity sensor according to claim 5, wherein the first separation means, after a lapse of a predetermined time from the timing at which the carrier waves are switched by the switching means, separates the third detection signal.

18. An angular velocity sensor according to claim 9, wherein the first separation means, after a lapse of a predetermined time from the timing at which the carrier waves are switched by the switching means, separates the third detection signal.

19. An angular velocity sensor according to claim 3, wherein the predetermined time is set to a value which falls within a range from 3 to $4\tau$ from the timing at which the carrier waves are switched by the switching means.

20. An angular velocity sensor according to claim 13, wherein the predetermined time is set to a value which falls within a range from 3 to $4\tau$ from the timing at which the carrier waves are switched by the switching means.

* * * * *